(12) United States Patent
Kawana

(10) Patent No.: US 11,933,952 B2
(45) Date of Patent: Mar. 19, 2024

(54) ZOOM LENS AND IMAGING APPARATUS

(71) Applicant: FUJIFILM Corporation, Tokyo (JP)

(72) Inventor: Masanao Kawana, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 26 days.

(21) Appl. No.: 17/370,496

(22) Filed: Jul. 8, 2021

(65) Prior Publication Data

US 2022/0026693 A1    Jan. 27, 2022

(30) Foreign Application Priority Data

Jul. 21, 2020 (JP) ................................. 2020-124467

(51) Int. Cl.
*G02B 15/14* (2006.01)
*G02B 15/167* (2006.01)
*G02B 15/177* (2006.01)

(52) U.S. Cl.
CPC ... *G02B 15/145523* (2019.08); *G02B 15/167* (2013.01); *G02B 15/177* (2013.01)

(58) Field of Classification Search
CPC ............ G02B 15/145523; G02B 15/16; G02B 15/167; G02B 15/177; G02B 13/22; G02B 15/14; G02B 15/1465; G02B 15/20; G02B 15/145531; H04N 5/225; H04N 5/74
USPC ....... 359/739, 745, 746, 676, 683, 680–686, 359/713, 714, 737, 649–651, 770, 753, 359/754, 761
See application file for complete search history.

(56) References Cited

U.S. PATENT DOCUMENTS

| 6,008,952 | A | * | 12/1999 | Yamamoto | ........... G02B 15/177 359/683 |
| 6,137,638 | A | | 10/2000 | Yamagishi et al. | |
| 7,944,625 | B2 | * | 5/2011 | Hatada | ................... G02B 13/04 359/753 |
| 2002/0015235 | A1 | * | 2/2002 | Hirose | ........... G02B 15/145523 359/684 |

(Continued)

FOREIGN PATENT DOCUMENTS

| JP | 2001-051194 A | 2/2001 |
| JP | 2001-324677 A | 11/2001 |

(Continued)

OTHER PUBLICATIONS

Office Action; "Notice of Reasons for Refusal," mailed by the Japanese Patent Office dated May 9, 2023, which corresponds to Japanese Patent Application No. 2020-124467 and is related to U.S. Appl. No. 17/370,496; with English language translation.

*Primary Examiner* — Thomas K Pham
*Assistant Examiner* — Kuei-Jen L Edenfield
(74) *Attorney, Agent, or Firm* — Studebaker & Brackett PC

(57) ABSTRACT

A zoom lens consists of, in order from an object side, a negative first lens group, a positive second lens group, a positive third lens group, a negative fourth lens group, and a positive fifth lens group. The first lens group consists of, in order from the object side, a first A lens group that does not move during focusing, a first B lens group that moves during focusing, and a first C lens group that does not move during focusing. During zooming, the first lens group and the fifth lens group do not move, and the second lens group, the third lens group, and the fourth lens group move. The fourth lens group includes a stop. The zoom lens satisfies a predetermined conditional expression.

18 Claims, 16 Drawing Sheets

(56) References Cited

U.S. PATENT DOCUMENTS

| | | | |
|---|---|---|---|
| 2002/0181120 A1* | 12/2002 | Nagahara | G02B 15/145523 359/683 |
| 2006/0139766 A1* | 6/2006 | Sawamoto | G02B 15/145523 359/680 |
| 2007/0229967 A1 | 10/2007 | Nagahara | |
| 2008/0304162 A1 | 12/2008 | Yamasaki | |
| 2009/0195884 A1* | 8/2009 | Inoko | G02B 13/22 359/682 |
| 2013/0070114 A1* | 3/2013 | Imaoka | G02B 15/145523 359/680 |

FOREIGN PATENT DOCUMENTS

| | | |
|---|---|---|
| JP | 2003-255226 A | 9/2003 |
| JP | 2007-271669 A | 10/2007 |
| JP | 2008-304765 A | 12/2008 |
| JP | 2018-189766 A | 11/2018 |
| JP | 2019-003073 A | 1/2019 |

* cited by examiner

FIG. 1
EXAMPLE 1
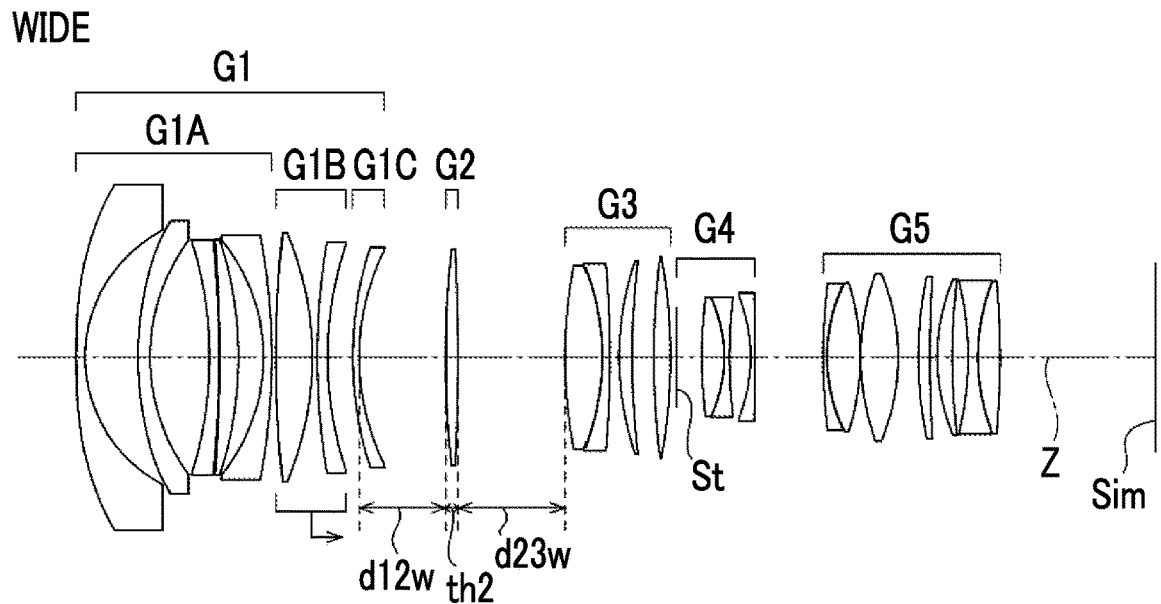
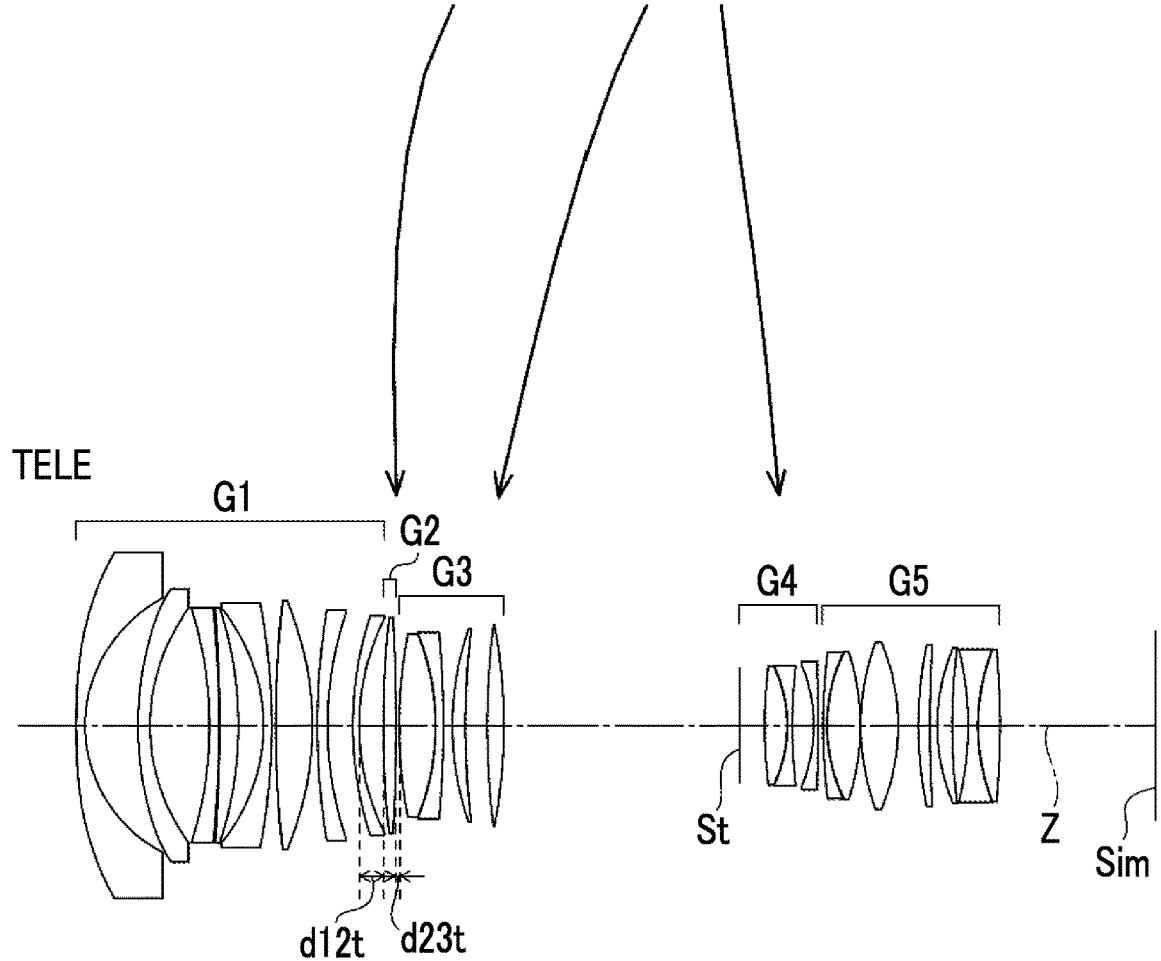

EXAMPLE 2

EXAMPLE 3

EXAMPLE 4

EXAMPLE 5

EXAMPLE 6

EXAMPLE 7

ZOOM LENS AND IMAGING APPARATUS

CROSS-REFERENCE TO RELATED APPLICATIONS

The present application claims priority under 35 U.S.C. § 119 to Japanese Patent Application No. 2020-124467, filed on Jul. 21, 2020. The above application is hereby expressly incorporated by reference, in its entirety, into the present application.

BACKGROUND OF THE INVENTION

1. Field of the Invention

The technology of the present disclosure relates to a zoom lens and an imaging apparatus.

2. Description of the Related Art

A lens system disclosed in JP2019-003073A is known as a zoom lens applicable to an imaging apparatus such as a movie imaging camera, a broadcasting camera, and a digital camera.

SUMMARY OF THE INVENTION

In recent years, there has been a demand for a zoom lens that is configured to have a small size and has favorable optical characteristics.

The present disclosure is conceived in view of the above matter, and an aim thereof is to provide a zoom lens achieving size reduction and having favorable optical characteristics, and an imaging apparatus comprising the zoom lens.

A zoom lens according to a first aspect of the present disclosure consists of, in order from an object side to an image side, a first lens group having a negative refractive power, a second lens group having a positive refractive power, a third lens group having a positive refractive power, a fourth lens group having a negative refractive power, and a fifth lens group having a positive refractive power, in which the first lens group consists of, in order from the object side to the image side, a first A lens group that remains stationary with respect to an image surface during focusing, a first B lens group that moves during focusing, and a first C lens group that remains stationary with respect to the image surface during focusing, during zooming from a wide angle end to a telephoto end, the first lens group and the fifth lens group remain stationary with respect to the image surface, and the second lens group, the third lens group, and the fourth lens group move along an optical axis by changing a mutual interval, the second lens group at the telephoto end is positioned closer to the object side than the second lens group at the wide angle end, the third lens group at the telephoto end is positioned closer to the object side than the third lens group at the wide angle end, the fourth lens group at the telephoto end is positioned closer to the image side than the fourth lens group at the wide angle end, the fourth lens group includes a stop, and in a case where a difference in optical axis direction between a position of the second lens group at the telephoto end and a position of the second lens group at the wide angle end is denoted by z2t, and a focal length of the second lens group is denoted by f2, Conditional Expression (1) below is satisfied.

$$0.05 < z2t/f2 < 0.1 \tag{1}$$

In the zoom lens according to the first aspect of the present disclosure, it is preferable that Conditional Expression (1-1) below is satisfied.

$$0.06 < z2t/f2 < 0.09 \tag{1-1}$$

In the zoom lens according to the first aspect of the present disclosure, in a case where a difference in optical axis direction between a position of the second lens group at the telephoto end and a position of the second lens group at the wide angle end is denoted by z2t, and a difference in optical axis direction between a position of the third lens group at the telephoto end and a position of the third lens group at the wide angle end is denoted by z3t, it is preferable that Conditional Expression (2) below is satisfied, and it is more preferable that Conditional Expression (2-1) below is satisfied.

$$0.25 < z2t/z3t < 0.45 \tag{2}$$

$$0.3 < z2t/z3t < 0.4 \tag{2-1}$$

In the zoom lens according to the first aspect of the present disclosure, in a case where an interval on the optical axis between the first lens group and the second lens group at the wide angle end is denoted by d12w, an interval on the optical axis between the second lens group and the third lens group at the wide angle end is denoted by d23w, an interval on the optical axis between the first lens group and the second lens group at the telephoto end is denoted by d12t, and an interval on the optical axis between the second lens group and the third lens group at the telephoto end is denoted by d23t, it is preferable that Conditional Expression (3) below is satisfied, and it is more preferable that Conditional Expression (3-1) below is satisfied.

$$0.01 < (d12t + d23t)/(d12w + d23w) < 0.2 \tag{3}$$

$$0.05 < (d12t + d23t)/(d12w + d23w) < 0.16 \tag{3-1}$$

In the zoom lens according to the first aspect of the present disclosure, in a state where an object at infinity is focused, in a case where a focal length of an entire system at the wide angle end is denoted by fw, a focal length of the entire system at the telephoto end is denoted by ft, a difference in optical axis direction between a position of the second lens group in a zooming state where the focal length of the entire system is $fw \times (ft/fw)^{0.2}$ and the position of the second lens group at the wide angle end is denoted by z2a, and a difference in optical axis direction between the position of the second lens group at the telephoto end and the position of the second lens group at the wide angle end is denoted by z2t, it is preferable that Conditional Expression (4) below is satisfied, and it is more preferable that Conditional Expression (4-1) below is satisfied.

$$0.45 < z2a/z2t < 0.55 \tag{4}$$

$$0.47 < z2a/z2t < 0.53 \tag{4-1}$$

In the zoom lens according to the first aspect of the present disclosure, in a state where an object at infinity is focused, in a case where a focal length of an entire system at the wide angle end is denoted by fw, a focal length of the entire system at the telephoto end is denoted by ft, a difference in optical axis direction between a position of the second lens group in a zooming state where the focal length of the entire system is $fw \times (ft/fw)^{0.4}$ and the position of the second lens group at the wide angle end is denoted by z2b, and a difference in optical axis direction between the position of the second lens group at the telephoto end and the position of the second lens group at the wide angle end is denoted by z2t, it is preferable that Conditional Expression (5) below is satisfied, and it is more preferable that Conditional Expression (5-1) below is satisfied.

$$0.75 < z2b/z2t < 0.85 \quad (5)$$

$$0.76 < z2b/z2t < 0.84 \quad (5\text{-}1)$$

A zoom lens according to a second aspect of the present disclosure consists of, in order from an object side to an image side, a first lens group having a negative refractive power, a second lens group having a positive refractive power, a third lens group having a positive refractive power, a fourth lens group having a negative refractive power, and a fifth lens group having a positive refractive power, in which the first lens group consists of a first A lens group that remains stationary with respect to an image surface during focusing, a first B lens group that moves during focusing, and a first C lens group that remains stationary with respect to the image surface during focusing, during zooming from a wide angle end to a telephoto end, the first lens group and the fifth lens group remain stationary with respect to the image surface, and the second lens group, the third lens group, and the fourth lens group move along an optical axis by changing a mutual interval, the second lens group at the telephoto end is positioned closer to the object side than the second lens group at the wide angle end, the third lens group at the telephoto end is positioned closer to the object side than the third lens group at the wide angle end, the fourth lens group at the telephoto end is positioned closer to the image side than the fourth lens group at the wide angle end, the fourth lens group includes a stop, and in a case where a sum of a distance on the optical axis from a lens surface of the first lens group closest to the object side to a lens surface of the fifth lens group closest to the image side, and a back focus of an entire system as an air conversion distance is denoted by TL, and a maximum image height is denoted by Y, Conditional Expression (6) below is satisfied.

$$10 < TL/Y < 12 \quad (6)$$

In the zoom lens according to the second aspect of the present disclosure, it is preferable that Conditional Expression (6-1) below is satisfied.

$$10.5 < TL/Y < 11.5 \quad (6\text{-}1)$$

In the zoom lenses according to the first and second aspects of the present disclosure, in a case where a distance on the optical axis from a lens surface of the second lens group closest to the object side to a lens surface of the second lens group closest to the image side is denoted by th2, and a focal length of the second lens group is denoted by f2, it is preferable that Conditional Expression (7) below is satisfied, and it is more preferable that Conditional Expression (7-1) below is satisfied.

$$0 < th2/f2 < 0.05 \quad (7)$$

$$0 < th2/f2 < 0.03 \quad (7\text{-}1)$$

In a case where the zoom lenses according to the first and second aspects of the present disclosure satisfy Conditional Expression (7), it is preferable that the second lens group consists of one positive lens.

In the zoom lenses according to the first and second aspects of the present disclosure, it is preferable that the fifth lens group includes at least one cemented lens consisting of one positive lens and one negative lens. In the zoom lenses according to the first and second aspects of the present disclosure, in a case where a d line-based Abbe number and a partial dispersion ratio between a g line and an F line for the positive lens composing the cemented lens closest to the image side among the cemented lenses included in the fifth lens group are denoted by νp and θp, and a d line-based Abbe number and a partial dispersion ratio between a g line and an F line for the negative lens composing the cemented lens closest to the image side among the cemented lenses included in the fifth lens group are denoted by νn and θn, it is preferable that Conditional Expressions (8) and (9) below are satisfied. In addition, in the zoom lenses according to the first and second aspects of the present disclosure, it is more preferable that at least one of Conditional Expression (8-1) or (9-1) below is satisfied after Conditional Expressions (8) and (9) are satisfied.

$$40 < \nu p - \nu n < 82 \quad (8)$$

$$0.03 < (\theta p - \theta n) + 0.001623 \times (\nu p - \nu n) < 0.042 \quad (9)$$

$$45 < \nu p - \nu n < 82 \quad (8\text{-}1)$$

$$0.032 < (\theta p - \theta n) + 0.001623 \times (\nu p - \nu n) < 0.04 \quad (9\text{-}1)$$

In the zoom lenses according to the first and second aspects of the present disclosure, it is preferable that the third lens group consists of four lenses.

An imaging apparatus according to another aspect of the present disclosure comprises at least one of the zoom lenses according to the first and second aspects of the present disclosure.

In the present specification, "consist of" or "consisting of" means that a lens that substantially does not have a refractive power, and optical elements such as a stop, a filter, and a cover glass other than a lens, mechanism parts such as a lens flange, a lens barrel, an imaging element, and a camera shake correction mechanism, and the like may be included besides illustrated constituents.

In the present specification, a "~ group having a positive refractive power" means that the entire group has a positive refractive power. Similarly, a "~ group having a negative refractive power" means that the entire group has a negative refractive power. A "lens having a positive refractive power" and a "positive lens" have the same meaning. A "lens having a negative refractive power" and a "negative lens" have the same meaning. A "~ lens group" is not limited to a configuration consisting of a plurality of lenses and may be configured to consist of only one lens.

A compound aspherical lens (a lens in which a spherical lens and a film of an aspherical shape formed on the spherical lens are configured as a single unit and function as one aspherical lens as a whole) is not regarded as a cemented lens and is handled as one lens. A sign of a refractive power and a surface shape related to a lens including an aspherical surface are considered in a paraxial region unless otherwise specified.

In the present specification, the "entire system" means the zoom lens. The "back focus of the entire system as the air conversion distance" is an air conversion distance on the optical axis from a lens surface of the zoom lens closest to the image side to a focal position of the zoom lens on the image side. The "focal length" used in the conditional expressions is a paraxial focal length. The values used in the conditional expressions are values based on the d line in a state where the object at infinity is focused.

A partial dispersion ratio θgF of a certain lens between the g line and the F line is defined as θgF=(Ng−NF)/(NF−NC) in a case where the refractive indexes of the lens with respect to the g line, the F line, and a C line are denoted by Ng, NF, and NC, respectively. In the present specification, the "d line", the "C line", the "F line", and the "g line" are bright lines. In the present specification, a wavelength of the d line is 587.56 nanometers (nm). A wavelength of the C line is 656.27 nanometers (nm). A wavelength of the F line is 486.13 nanometers (nm). A wavelength of the g line is 435.84 nanometers (nm).

According to the present disclosure, a zoom lens achieving size reduction and having favorable optical characteristics, and an imaging apparatus including the zoom lens can be provided.

BRIEF DESCRIPTION OF THE DRAWINGS

FIG. 1 is a diagram corresponding to a zoom lens of Example 1 and illustrating a cross-sectional configuration and a movement trajectory of a zoom lens according to one embodiment.

DESCRIPTION OF THE PREFERRED EMBODIMENTS

Hereinafter, an embodiment of the present disclosure will be described with reference to the drawings. FIG. 1 illustrates a cross-sectional view of a configuration of a zoom lens according to one embodiment of the present disclosure. In FIG. 1, a wide angle end state is illustrated in an upper part denoted by "WIDE", and a telephoto end state is illustrated in a lower part denoted by "TELE". In FIG. 1, a state where an object at infinity is focused is illustrated. A left side is an object side, and a right side is an image side.

An example illustrated in FIG. 1 corresponds to a zoom lens of Example 1 described later.

The zoom lens according to one embodiment of the present disclosure consists of, in order from the object side to the image side, a first lens group G1 having a negative refractive power, a second lens group G2 having a positive refractive power, a third lens group G3 having a positive refractive power, a fourth lens group G4 having a negative refractive power, and a fifth lens group G5 having a positive refractive power.

During zooming from a wide angle end to a telephoto end, the first lens group G1 and the fifth lens group G5 remain stationary with respect to an image surface Sim. By having a configuration in which the first lens group G1 and the fifth lens group G5 remain stationary during zooming, a distance from a lens surface closest to the object side to a lens surface closest to the image side is not changed during zooming, and a change in centroid of a lens system can be reduced. Thus, convenience of use during imaging can be increased. In addition, during zooming from the wide angle end to the telephoto end, the second lens group G2, the third lens group G3, and the fourth lens group G4 move along an optical axis Z by changing a mutual interval. In FIG. 1, as an example, a schematic movement trajectory of each of the second lens group G2, the third lens group G3, and the fourth lens group G4 during zooming from the wide angle end to the telephoto end is illustrated by an arrow between the upper part and the lower part.

Figure 2:
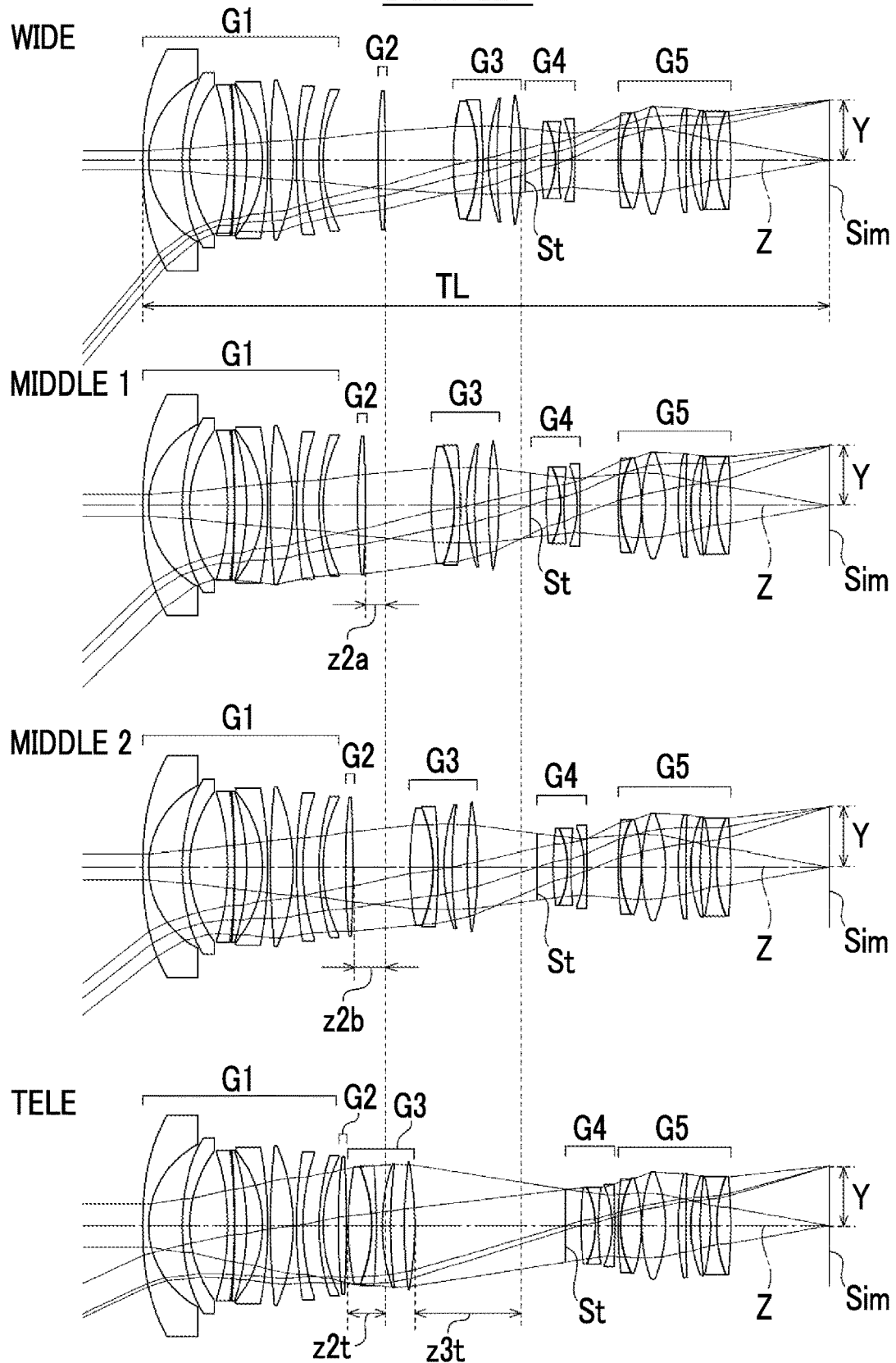
FIG. 2 is a diagram illustrating the cross-sectional configuration and luminous flux of the zoom lens illustrated in FIG. 1.

FIG. 2 illustrates a cross-sectional view of the configuration of the zoom lens in FIG. 1 and luminous flux in each zooming state. In FIG. 2, the wide angle end state is illustrated in an uppermost part denoted by "WIDE", a first middle focal length state is illustrated in a second part denoted by "MIDDLE1" from the top, a second middle focal length state is illustrated in a third part denoted by "MIDDLE2" from the top, and the telephoto end state is illustrated in a lowermost part denoted by "TELE". In FIG. 2, axial luminous flux and luminous flux of a maximum image height Y are illustrated as the luminous flux.

In this zoom lens, it is configured that the second lens group G2 at the telephoto end is positioned closer to the object side than the second lens group G2 at the wide angle end, the third lens group G3 at the telephoto end is positioned closer to the object side than the third lens group G3 at the wide angle end, and the fourth lens group G4 at the telephoto end is positioned closer to the image side than the fourth lens group G4 at the wide angle end. In examples illustrated in FIG. 1 and FIG. 2, during zooming from the wide angle end to the telephoto end, the second lens group G2 moves to the object side in most of a zooming range, the third lens group G3 always moves to the object side, and the fourth lens group G4 always moves to the image side.

In addition, in this zoom lens, the fourth lens group G4 is configured to include an aperture stop St. During zooming, a position of an incidence pupil can be brought closer to the object side on a wide angle side by moving the aperture stop St in the same manner as a behavior of the fourth lens group G4. Thus, an increase in diameter of a lens of the entire system closest to the object side can be suppressed. Accordingly, an advantage for accomplishing an increase in wide angle while achieving size reduction is provided. The aperture stop St in FIG. 1 and FIG. 2 does not illustrate a shape and a size and illustrates a position in an optical axis direction.

Focusing on a height of an axial marginal ray in the second lens group G2 having the behavior during zooming, as illustrated in FIG. 2, the height at the telephoto end is apparently increased, compared to the height at the wide angle end. In a case where the second lens group G2 moves, an amount of change in aberration and an amount of change in position of the image surface per movement amount of the second lens group G2 are increased as the height is increased. That is, on a telephoto side compared to the wide angle side, aberration and the position of the image surface are changed with high sensitivity in response to movement of the second lens group G2. Accordingly, in a case where aberration correction and correction of the position of the image surface are performed by moving the second lens group G2, correction can be efficiently performed on the telephoto side by simply moving the second lens group G2 by a small amount.

In such a zoom lens, in a case where a difference in optical axis direction between a position of the second lens group G2 at the telephoto end and a position of the second lens group G2 at the wide angle end is denoted by z2t, and a focal length of the second lens group G2 is denoted by f2, it is preferable that the zoom lens satisfies Conditional Expression (1) below. By satisfying a corresponding value of Conditional Expression (1) not to be less than or equal to a lower limit, insufficient aberration correction in the second lens group G2 can be suppressed. By satisfying the corresponding value of Conditional Expression (1) not to be greater than or equal to an upper limit, excessive aberration correction in the second lens group G2 can be suppressed. By satisfying Conditional Expression (1), an advantage for maintaining favorable optical characteristics is provided. In order to obtain more favorable characteristics, it is more preferable that the zoom lens satisfies Conditional Expression (1-1) below.

$$0.05 < z2t/f2 < 0.1 \tag{1}$$

$$0.06 < z2t/f2 < 0.09 \tag{1-1}$$

Conditional Expression (1) is an expression related to the movement amount of the second lens group G2 during zooming from the wide angle end to the telephoto end, and the focal length of the second lens group G2. In a case where Conditional Expression (1) is satisfied, the second lens group G2 has a relatively weak refractive power. In a zooming system, such a second lens group G2 is suitable as a compensator that corrects a change in aberration and a change in position of the image surface caused during zooming.

In addition, in a case where the difference in optical axis direction between the position of the second lens group G2 at the telephoto end and the position of the second lens group G2 at the wide angle end is denoted by z2t, and a difference in optical axis direction between a position of the third lens group G3 at the telephoto end and a position of the third lens group G3 at the wide angle end is denoted by z3t, it is preferable that the zoom lens satisfies Conditional Expression (2) below. By satisfying a corresponding value of Conditional Expression (2) not to be less than or equal to a lower limit, insufficient aberration correction in the second lens group G2 can be suppressed. Thus, an advantage for maintaining favorable optical characteristics is provided. By satisfying the corresponding value of Conditional Expression (2) not to be greater than or equal to an upper limit, size increase of the lens system with respect to a magnification ratio can be suppressed. In order to obtain more favorable characteristics, it is more preferable that the zoom lens satisfies Conditional Expression (2-1) below.

$$0.25 < z2t/z3t < 0.45 \tag{2}$$

$$0.3 < z2t/z3t < 0.4 \tag{2-1}$$

Conditional Expression (2) is an expression related to a ratio of the movement amount of the second lens group G2 and a movement amount of the third lens group G3 during zooming from the wide angle end to the telephoto end. In a case where Conditional Expression (2) is satisfied, the third lens group G3 can suitably function as a main variator having a positive refractive power, and the second lens group G2 can suitably function as the compensator.

In addition, in a case where an interval between the first lens group G1 and the second lens group G2 on the optical axis at the wide angle end is denoted by d12w, an interval between the second lens group G2 and the third lens group G3 on the optical axis at the wide angle end is denoted by d23w, an interval between the first lens group G1 and the second lens group G2 on the optical axis at the telephoto end is denoted by d12t, and an interval between the second lens group G2 and the third lens group G3 on the optical axis at the telephoto end is denoted by d23t, it is preferable that the zoom lens satisfies Conditional Expression (3) below. By satisfying a corresponding value of Conditional Expression (3) not to be less than or equal to a lower limit, excessive aberration correction in the second lens group G2 can be suppressed. By satisfying the corresponding value of Conditional Expression (3) not to be greater than or equal to an upper limit, insufficient aberration correction in the second lens group G2 can be suppressed. By satisfying Conditional Expression (3), an advantage for maintaining favorable optical characteristics is provided. In order to obtain more favorable characteristics, it is more preferable that the zoom lens satisfies Conditional Expression (3-1) below.

$$0.01 < (d12t+d23t)/(d12w+d23w) < 0.2 \tag{3}$$

$$0.05 < (d12t+d23t)/(d12w+d23w) < 0.16 \tag{3-1}$$

Conditional Expression (3) is an expression related to air intervals on the object side and the image side of the second lens group G2. On the telephoto side, as the air interval on the object side of the second lens group G2 is decreased, the height of the axial marginal ray in the second lens group G2 is increased, and sensitivity of the aberration correction and correction of the position of the image surface in a case of moving the second lens group G2 is increased. That is, since the movement amount of the second lens group G2 required for these types of correction on the telephoto side is decreased, an advantage for achieving size reduction is provided.

In a state where the object at infinity is focused, in a case where a focal length of the entire system at the wide angle end is denoted by fw, a focal length of the entire system at the telephoto end is denoted by ft, a difference in optical axis direction between the position of the second lens group G2 in a zooming state where the focal length of the entire system is $fw \times (ft/fw)^{0.2}$ and the position of the second lens group G2 at the wide angle end is denoted by z2a, and a difference in optical axis direction between the position of the second lens group G2 at the telephoto end and the position of the second lens group G2 at the wide angle end is denoted by z2t, it is preferable that the zoom lens satisfies Conditional Expression (4) below. By satisfying a corresponding value of Conditional Expression (4) not to be less than or equal to a lower limit, insufficient aberration correction in the second lens group G2 on the wide angle side can be suppressed. By satisfying the corresponding value of Conditional Expression (4) not to be greater than or equal to an upper limit, excessive aberration correction in the second lens group G2 on the wide angle side can be suppressed. By satisfying Conditional Expression (4), an advantage for maintaining favorable optical characteristics is provided. In order to obtain more favorable characteristics, it is more preferable that the zoom lens satisfies Conditional Expression (4-1) below.

$$0.45 < z2a/z2t < 0.55 \quad (4)$$

$$0.47 < z2a/z2t < 0.53 \quad (4\text{-}1)$$

Here, ft/fw related to Conditional Expression (4) is a zoom ratio at the telephoto end. In the present specification, the zooming state where the focal length of the entire system is $fw \times (ft/fw)^{0.2}$ will be referred to as a first middle focal length state. The first middle focal length state is a zooming state where the zoom ratio is a 0.2nd power of the zoom ratio at the telephoto end, and is a zooming state that is relatively on the wide angle side. Here, z2a/z2t denotes a ratio of the movement amount of the second lens group G2 from the wide angle end to the first middle focal length state, to the movement amount of the second lens group G2 from the wide angle end to the telephoto end. Generally, as a value of z2a/z2t is increased, the second lens group G2 tends to significantly move on the wide angle side and slightly move on the telephoto side during zooming.

In a state where the object at infinity is focused, in a case where the focal length of the entire system at the wide angle end is denoted by fw, a focal length of the entire system at the telephoto end is denoted by ft, a difference in optical axis direction between the position of the second lens group G2 in a zooming state where the focal length of the entire system is $fw \times (ft/fw)^{0.4}$ and the position of the second lens group G2 at the wide angle end is denoted by z2b, and the difference in optical axis direction between the position of the second lens group G2 at the telephoto end and the position of the second lens group G2 at the wide angle end is denoted by z2t, it is preferable that the zoom lens satisfies Conditional Expression (5) below. In the present specification, the zooming state where the focal length of the entire system is $fw \times (ft/fw)^{0.4}$ will be referred to as a second middle focal length state. By satisfying a corresponding value of Conditional Expression (5) not to be less than or equal to a lower limit, insufficient aberration correction in the second lens group G2 on the wide angle side can be suppressed. By satisfying the corresponding value of Conditional Expression (5) not to be greater than or equal to an upper limit, excessive aberration correction in the second lens group G2 on the wide angle side can be suppressed. By satisfying Conditional Expression (5), an advantage for maintaining favorable optical characteristics is provided. In order to obtain more favorable characteristics, it is more preferable that the zoom lens satisfies Conditional Expression (5-1) below.

$$0.75 < z2b/z2t < 0.85 \quad (5)$$

$$0.76 < z2b/z2t < 0.84 \quad (5\text{-}1)$$

In the present specification, the zooming state where the focal length of the entire system is $fw \times (ft/fw)^{0.4}$ will be referred to as the second middle focal length state. The second middle focal length state is a zooming state where the zoom ratio is a 0.4th power of the zoom ratio at the telephoto end. Here, z2b/z2t denotes a ratio of the movement amount of the second lens group G2 from the wide angle end to the second middle focal length state, to the movement amount of the second lens group G2 from the wide angle end to the telephoto end.

In a case where a sum of a distance on the optical axis from a lens surface of the first lens group G1 closest to the object side to a lens surface of the fifth lens group G5 closest to the image side, and a back focus of the entire system as an air conversion distance is denoted by TL, and the maximum image height is denoted by Y, it is preferable that the zoom lens satisfies Conditional Expression (6) below. By satisfying a corresponding value of Conditional Expression (6) not to be less than or equal to a lower limit, an advantage for maintaining various types of aberration in a favorable state is provided. By satisfying the corresponding value of Conditional Expression (6) not to be greater than or equal to an upper limit, an advantage for suppressing size increase of the lens system is provided. In order to obtain more favorable characteristics, it is more preferable that the zoom lens satisfies Conditional Expression (6-1) below.

$$10 < TL/Y < 12 \quad (6)$$

$$10.5 < TL/Y < 11.5 \quad (6\text{-}1)$$

In a case where a distance on the optical axis from a lens surface of the second lens group G2 closest to the object side to a lens surface of the second lens group G2 closest to the image side is denoted by th2, and the focal length of the second lens group G2 is denoted by f2, it is preferable that the zoom lens satisfies Conditional Expression (7) below. The second lens group G2 is a lens group having a positive refractive power and thus, satisfies 0<th2/f2. By satisfying a corresponding value of Conditional Expression (7) not to be greater than or equal to an upper limit, an advantage for suppressing size increase of the lens system is provided. In order to obtain more favorable characteristics, it is more preferable that the zoom lens satisfies Conditional Expression (7-1) below.

$$0 < th2/f2 < 0.05 \quad (7)$$

$$0 < th2/f2 < 0.03 \quad (7\text{-}1)$$

It is preferable that the fifth lens group G5 includes at least one cemented lens consisting of one positive lens and one negative lens. In such a case, an advantage for correction of chromatic aberration is provided.

In a configuration in which the fifth lens group G5 includes at least one cemented lens consisting of one positive lens and one negative lens, it is preferable that the zoom lens satisfies Conditional Expression (8) below. Here, d line-based Abbe numbers of the positive lens and the negative lens composing the cemented lens closest to the image side among the cemented lenses included in the fifth lens group G5 are denoted by νp and νn, respectively. By satisfying a corresponding value of Conditional Expression (8) not to be less than or equal to a lower limit, an advantage for suppressing axial chromatic aberration and lateral chromatic aberration is provided. By satisfying the corresponding value of Conditional Expression (8) not to be greater than or equal to an upper limit, an advantage for suppressing excessive correction of a secondary spectrum of the lateral chromatic aberration is provided. By satisfying Conditional Expression (8), an advantage for favorable correction of the chromatic aberration is provided. In order to obtain more favorable characteristics, it is more preferable that the zoom lens satisfies Conditional Expression (8-1) below, and it is further preferable that the zoom lens satisfies Conditional Expression (8-2) below.

$$40 < \nu p - \nu n < 82 \quad (8)$$

$$45 < \nu p - \nu n < 82 \quad (8\text{-}1)$$

$$50 < \nu p - \nu n < 82 \quad (8\text{-}2)$$

In the configuration in which the fifth lens group G5 includes at least one cemented lens consisting of one positive lens and one negative lens, it is preferable that the zoom lens satisfies Conditional Expression (9) below. Here, the d line-based Abbe number and a partial dispersion ratio between a g line and an F line for the positive lens composing the cemented lens closest to the image side among the cemented lenses included in the fifth lens group G5 are denoted by νp and θp, respectively. In addition, the d line-based Abbe number and a partial dispersion ratio between a g line and an F line for the negative lens composing the cemented lens closest to the image side among the cemented lenses included in the fifth lens group G5 are denoted by νn and θn, respectively. By satisfying a corresponding value of Conditional Expression (9) not to be less than or equal to a lower limit, an advantage for suppressing excessive correction of a secondary spectrum of the lateral chromatic aberration on a short wavelength side is provided. By satisfying the corresponding value of Conditional Expression (9) not to be greater than or equal to an upper limit, an advantage for suppressing insufficient correction of the secondary spectrum of the lateral chromatic aberration on the short wavelength side is provided. By satisfying Conditional Expression (9), an advantage for favorable correction of the chromatic aberration is provided. In order to obtain more favorable characteristics, it is more preferable that the zoom lens satisfies Conditional Expression (9-1) below.

$$0.03<(\theta p-\theta n)+0.001623\times(\nu p-\nu n)<0.042 \quad (9)$$

$$0.032<(\theta p-\theta n)+0.001623\times(\nu p-\nu n)<0.04 \quad (9\text{-}1)$$

In the configuration in which the fifth lens group G5 includes at least one cemented lens consisting of one positive lens and one negative lens, it is more preferable that the zoom lens satisfies Conditional Expression (8) and Conditional Expression (9). Furthermore, it is further preferable that the zoom lens satisfies Conditional Expression (8) and Conditional Expression (9) and satisfies at least one of Conditional Expression (8-1), Conditional Expression (8-2), or Conditional Expression (9-1).

Focusing may be configured to be performed by moving a part of the first lens group G1. In the example in FIG. 1, the first lens group G1 consists of, in order from the object side to the image side, a first A lens group G1A that remains stationary with respect to the image surface Sim during focusing, a first B lens group G1B that moves along the optical axis Z during focusing, and a first C lens group G1C that remains stationary with respect to the image surface Sim during focusing. Hereinafter, a lens group that moves during focusing will be referred to as a focus group. A bracket and a horizontal rightward arrow written below the first B lens group G1B in the upper part of FIG. 1 indicate that the first B lens group G1B is the focus group that moves to the image side during focusing from the object at infinity to the nearest object. By performing focusing using a group that is closer to the object side than a lens group moving during zooming, a movement amount of a lens group moving during focusing can be suppressed, and an advantage for establishing both of size reduction and a high magnification is provided. In addition, since the first lens group G1 does not move during zooming, using a lens group of a part of the first lens group G1 as the focus group causes an image point of the focus group to not move during zooming. Thus, a change in focusing position during zooming can be suppressed.

The example illustrated in FIG. 1 is an example and can be subjected to various modifications without departing from a gist of the technology of the present disclosure. For example, the number of lenses composing each lens group may be a number different from the example in FIG. 1. In addition, for example, each lens group can employ the following configuration.

The first A lens group G1A can be configured to consist of five lenses. Specifically, the first A lens group G1A can be configured to consist of four negative lenses and one positive lens. More specifically, the first A lens group G1A can be configured to consist of, in order from the object side to the image side, three negative lenses, one positive lens, and one negative lens. In this case, a third lens from the object side and a fourth lens from the object side may be single lenses or may be cemented to each other.

The first B lens group G1B can be configured to consist of two lenses. Specifically, the first B lens group G1B can be configured to consist of one positive lens and one negative lens.

The first C lens group G1C can be configured to consist of one lens. In this case, the first C lens group G1C can be configured to consist of one negative lens.

The second lens group G2 can be configured to consist of one positive lens. In such a case, an advantage for size reduction is provided. More specifically, the second lens group G2 can be configured to consist of one positive lens having a convex surface toward the object side. This positive lens may be a biconvex lens, a positive meniscus lens, or a plano-convex lens.

The third lens group G3 can be configured to consist of four lenses. In such a case, the refractive power of the third lens group G3 can be distributed to a plurality of lenses. Thus, an advantage for reducing an occurring amount of aberration is provided. This is particularly effective in a case where the third lens group G3 has a strong positive refractive power. Specifically, the third lens group G3 can be configured to consist of three positive lenses and one negative lens. More specifically, the third lens group G3 can be configured to consist of, in order from the object side to the image side, one positive lens, one negative lens, and two positive lenses. In this case, a lens closest to the object side and a second lens from the object side in the third lens group G3 may be cemented to each other.

The fourth lens group G4 can be configured to consist of the aperture stop St and three lenses. Specifically, the fourth lens group G4 can be configured to consist of the aperture stop St, one positive lens, and two negative lenses. The aperture stop St may be configured to be arranged closest to the object side in the fourth lens group G4. In such a case, an advantage for achieving a decrease in diameter of the lens of the entire system closest to the object side is provided. For example, the fourth lens group G4 can be configured to consist of, in order from the object side to the image side, the aperture stop St, one positive lens, and two negative lenses. In this case, a lens closest to the object side and a second lens from the object side in the fourth lens group G4 may be cemented to each other.

The fifth lens group G5 can be configured to consist of seven lenses. Specifically, the fifth lens group G5 can be configured to consist of two negative lenses and five positive lenses. More specifically, the fifth lens group G5 can be configured to consist of, in order from the object side to the image side, one negative lens, four positive lenses, one negative lens, and one positive lens.

The above preferable configurations and available configurations including configurations related to the conditional expressions can be used in any combination thereof and are preferably appropriately selectively employed depending on required specifications. A range of available conditional expressions is not limited to a conditional expression written in an expression format and includes a range obtained by any combination of lower limits and upper limits from preferable, more preferable, and further preferable conditional expressions.

Hereinafter, three preferable forms of the zoom lens according to the embodiment of the present disclosure will be described. A zoom lens of a first form consists of, in order from the object side to the image side, the first lens group G1 that has a negative refractive power, the second lens group G2 that has a positive refractive power, the third lens group G3 that has a positive refractive power, the fourth lens group G4 that has a negative refractive power, and the fifth lens group G5 that has a positive refractive power. The first lens group G1 consists of, in order from the object side to the image side, the first A lens group G1A that remains stationary with respect to the image surface Sim during focusing, the first B lens group G1B that moves during focusing, and the first C lens group G1C that remains stationary with respect to the image surface Sim during focusing. During zooming from the wide angle end to the telephoto end, the first lens group G1 and the fifth lens group G5 remain stationary with respect to the image surface Sim, and the second lens group G2, the third lens group G3, and the fourth lens group G4 move along the optical axis Z by changing the mutual interval. The second lens group G2 at the telephoto end is positioned closer to the object side than the second lens group G2 at the wide angle end. The third lens group G3 at the telephoto end is positioned closer to the object side than the third lens group G3 at the wide angle end. The fourth lens group G4 at the telephoto end is positioned closer to the image side than the fourth lens group G4 at the wide angle end. The fourth lens group G4 includes the aperture stop St. The zoom lens satisfies Conditional Expression (1) above.

A zoom lens of a second form consists of, in order from the object side to the image side, the first lens group G1 that has a negative refractive power, the second lens group G2 that has a positive refractive power, the third lens group G3 that has a positive refractive power, the fourth lens group G4 that has a negative refractive power, and the fifth lens group G5 that has a positive refractive power. The first lens group G1 consists of the first A lens group G1A that remains stationary with respect to the image surface Sim during focusing, the first B lens group G1B that moves during focusing, and the first C lens group G1C that remains stationary with respect to the image surface Sim during focusing. During zooming from the wide angle end to the telephoto end, the first lens group G1 and the fifth lens group G5 remain stationary with respect to the image surface Sim, and the second lens group G2, the third lens group G3, and the fourth lens group G4 move along the optical axis Z by changing the mutual interval. The second lens group G2 at the telephoto end is positioned closer to the object side than the second lens group G2 at the wide angle end. The third lens group G3 at the telephoto end is positioned closer to the object side than the third lens group G3 at the wide angle end. The fourth lens group G4 at the telephoto end is positioned closer to the image side than the fourth lens group G4 at the wide angle end. The fourth lens group G4 includes the aperture stop St. The zoom lens satisfies Conditional Expression (2) above.

A zoom lens of a third form consists of, in order from the object side to the image side, the first lens group G1 that has a negative refractive power, the second lens group G2 that has a positive refractive power, the third lens group G3 that has a positive refractive power, the fourth lens group G4 that has a negative refractive power, and the fifth lens group G5 that has a positive refractive power. The first lens group G1 consists of the first A lens group G1A that remains stationary with respect to the image surface Sim during focusing, the first B lens group G1B that moves during focusing, and the first C lens group G1C that remains stationary with respect to the image surface Sim during focusing. During zooming from the wide angle end to the telephoto end, the first lens group G1 and the fifth lens group G5 remain stationary with respect to the image surface Sim, and the second lens group G2, the third lens group G3, and the fourth lens group G4 move along the optical axis Z by changing the mutual interval. The second lens group G2 at the telephoto end is positioned closer to the object side than the second lens group G2 at the wide angle end. The third lens group G3 at the telephoto end is positioned closer to the object side than the third lens group G3 at the wide angle end. The fourth lens group G4 at the telephoto end is positioned closer to the image side than the fourth lens group G4 at the wide angle end. The fourth lens group G4 includes the aperture stop St. The zoom lens satisfies Conditional Expression (6) above.

Next, examples of the zoom lens according to the embodiment of the present disclosure will be described.

Example 1

A configuration and a movement trajectory of the zoom lens of Example 1 are illustrated in FIG. 1, and a method and a configuration of illustration are described above. Thus, a duplicate description will be partially omitted here.

For the zoom lens of Example 1, fundamental lens data is shown in Table 1A and Table 1B, specifications and variable surface intervals are shown in Table 2, and aspherical coefficients are shown in Table 3. Here, the fundamental lens data is separately displayed in two tables of Table 1A and Table 1B in order to avoid one long table. Table 1A shows the first lens group G1 to the third lens group G3, and Table 1B shows the fourth lens group G4 and the fifth lens group G5. Table 1A, Table 1B, and Table 2 show data in a state where the object at infinity is focused.

In Table 1A and Table 1B, a field of Sn shows a surface number in a case where the number is increased by one at a time in a direction of the image side from a first surface denoting a surface closest to the object side. A field of R shows a radius of curvature of each surface. A field of D shows a surface interval on the optical axis between each surface and a surface adjacent thereto on the image side. A field of Nd shows a refractive index of each constituent with respect to a d line. A field of vd shows a d line-based Abbe number of each constituent. A field of θgF shows a partial dispersion ratio of each constituent between the g line and the F line. A field of material shows a material name and a manufacturing company name of the constituent with a period interposed therebetween. The manufacturing company name is abbreviated. HOYA Corporation is denoted by "HOYA". Ohara Corporation is denoted by "OHARA". SCHOTT AG is denoted by "SCHOTT". HIKARI GLASS Co., Ltd is denoted by "HIKARI". Sumita Optical Glass, Inc. is denoted by "SUMITA". CDGM Glass Co., Ltd. is denoted by "CDGM".

In Table 1A and Table 1B, a sign of a radius of curvature of a surface having a shape of a convex surface toward the object side is positive, and a sign of a radius of curvature of a surface having a surface of a convex surface toward the image side is negative. In Table 1B, a surface number and a word (St) are written in a field of a surface number of a surface corresponding to the aperture stop St. In Table 1A and Table 1B, a symbol DD[ ] is used for a variable surface interval during zooming and is written in the field of D by adding a surface number on the object side of this interval to the inside of [ ].

Table 2 shows a zoom ratio Zr, a focal length f, a back focus Bf, an F number FNo., a maximum total angle of view 2ω, the maximum image height Y, and the variable surface intervals during zooming based on the d line. In a field of 2ω, (°) means a unit of degrees. In Table 2, values in the wide angle end state, the first middle focal length state, the second middle focal length state, and the telephoto end state are shown in the fields denoted by WIDE, MIDDLE1, MIDDLE2, and TELE, respectively.

In the fundamental lens data, a surface number of an aspherical surface is marked with *, and a numerical value of a paraxial radius of curvature is written in the field of the radius of curvature of the aspherical surface. In Table 3, the field of Sn shows the surface number of the aspherical surface, and fields of KA and Am (m=4, 6, 8, and 10) show numerical values of the aspherical coefficients for each aspherical surface. In the numerical values of the aspherical coefficients in Table 3, "E±n" (n: integer) means "×10$^{±n}$". KA and Am are aspherical coefficients in an aspherical expression represented by the following expression.

$$Zd = C \times h^2 / \{1 + (1 - KA \times C^2 \times h^2)^{1/2}\} + \Sigma Am \times h^m$$

where

Zd: aspherical depth (length of a perpendicular line drawn from a point on an aspherical surface of a height h to a plane perpendicular to the optical axis through which an aspherical vertex passes)

h: height (distance from the optical axis to the lens surface)

C: reciprocal of the paraxial radius of curvature

KA and Am: aspherical coefficients

In the aspherical expression, Σ means a total sum related to m.

In data of each table, degree is used as a unit of angle, and millimeter (mm) is used as a unit of length. However, since the optical system can be used even in a case where the optical system is proportionally enlarged or proportionally reduced, other appropriate units can also be used. Numerical values rounded in predetermined digits are written in each table shown below.

TABLE 1A

Example 1

| Sn | R | D | Nd | vd | θgF | Material |
|---|---|---|---|---|---|---|
| *1 | 197.6901 | 2.1300 | 1.80610 | 33.27 | 0.58845 | NBFD15-W.HOYA |
| 2 | 36.0268 | 12.8300 | | | | |
| *3 | 83.8474 | 2.9000 | 1.72916 | 54.68 | 0.54451 | S-LAL18.OHARA |
| 4 | 50.1200 | 14.4100 | | | | |
| 5 | −99.1263 | 2.3200 | 1.77250 | 49.60 | 0.55212 | S-LAH66.OHARA |
| 6 | −295.3804 | 0.1400 | | | | |
| 7 | −384.7905 | 4.5100 | 1.84666 | 23.78 | 0.62054 | S-TIH53W.OHARA |
| 8 | −96.7510 | 6.0800 | | | | |
| 9 | −47.2592 | 2.0300 | 1.43700 | 95.10 | 0.53364 | FCD100.HOYA |
| 10 | −164.1124 | 0.9300 | | | | |
| 11 | 311.5971 | 8.6900 | 1.60863 | 46.60 | 0.56787 | N-BAF52.SCHOTT |
| 12 | −81.7048 | 1.1700 | | | | |
| 13 | 178.1816 | 2.5000 | 1.89286 | 20.36 | 0.63944 | S-NPH4.OHARA |
| 14 | 91.8627 | 6.1000 | | | | |
| 15 | 91.9406 | 1.5000 | 1.67270 | 32.18 | 0.59733 | J-SF5.HIKARI |
| 16 | 61.1884 | DD[16] | | | | |
| *17 | 311.9817 | 3.0000 | 1.88300 | 40.76 | 0.56679 | S-LAH58.OHARA |
| 18 | −535.3894 | DD[18] | | | | |
| 19 | 121.6720 | 8.8600 | 1.63246 | 63.77 | 0.54215 | K-LAFK60.SUMITA |
| 20 | −63.0221 | 1.9700 | 1.85150 | 40.78 | 0.56958 | S-LAH89.OHARA |
| 21 | −268.1054 | 2.2000 | | | | |
| 22 | 75.3389 | 3.1400 | 1.49700 | 81.61 | 0.53887 | FCD1.HOYA |
| 23 | 206.2248 | 5.2300 | | | | |
| 24 | 206.6968 | 3.9900 | 1.49700 | 81.61 | 0.53887 | FCD1.HOYA |
| 25 | −143.7754 | DD[25] | | | | |

TABLE 1B

Example 1

| Sn | R | D | Nd | vd | θgF | Material |
|---|---|---|---|---|---|---|
| 26 (St) | ∞ | 6.1200 | | | | |
| 27 | 124.8302 | 5.4500 | 1.84666 | 23.78 | 0.62054 | S-TIH53W.OHARA |
| 28 | −35.8318 | 1.2400 | 1.88300 | 40.76 | 0.56679 | S-LAH58.OHARA |
| 29 | 133.5968 | 5.0800 | | | | |
| 30 | −42.2691 | 1.0000 | 1.90043 | 37.37 | 0.57668 | TAFD37A.HOYA |
| 31 | −833.9226 | DD[31] | | | | |
| 32 | 150.6508 | 1.0000 | 1.85545 | 36.60 | 0.57920 | H-ZLAF3.CDGM |
| 33 | 44.6925 | 7.8200 | 1.55215 | 71.99 | 0.54103 | K-PSK500.SUMITA |
| 34 | −62.2986 | 0.1200 | | | | |
| 35 | 62.8452 | 9.0700 | 1.49700 | 81.61 | 0.53887 | FCD1.HOYA |
| 36 | −55.5875 | 4.8900 | | | | |

TABLE 1B-continued

Example 1

| Sn | R | D | Nd | vd | θgF | Material |
|---|---|---|---|---|---|---|
| 37 | 103.2891 | 2.8200 | 1.51760 | 63.54 | 0.53369 | K-PBK40.SUMITA |
| 38 | 375.3143 | 1.8000 | | | | |
| 39 | 52.2294 | 3.5600 | 1.43700 | 95.10 | 0.53364 | FCD100.HOYA |
| 40 | 156.1328 | 3.8800 | | | | |
| 41 | −80.6794 | 2.3200 | 1.85000 | 27.03 | 0.60935 | J-LASFH23.HIKARI |
| 42 | 53.2779 | 5.4300 | 1.43700 | 95.10 | 0.53364 | FCD100.HOYA |
| *43 | −148.1120 | 37.3700 | | | | |

TABLE 2

Example 1

| | WIDE | MIDDLE1 | MIDDLE2 | TELE |
|---|---|---|---|---|
| Zr | 1.0 | 1.2 | 1.4 | 2.4 |
| f | 19.77 | 23.50 | 27.92 | 46.86 |
| Bf | 37.37 | 37.37 | 37.37 | 37.37 |
| FNo. | 2.76 | 2.76 | 2.76 | 2.76 |
| 2ω (°) | 101.8 | 89.4 | 78.2 | 51.4 |
| Y | 23.15 | 23.15 | 23.15 | 23.15 |
| DD[16] | 20.95 | 13.23 | 8.49 | 5.89 |
| DD[18] | 25.72 | 25.05 | 21.66 | 0.81 |
| DD[25] | 1.49 | 11.90 | 22.65 | 56.66 |
| DD[31] | 16.54 | 14.52 | 11.90 | 1.34 |

TABLE 3

Example 1

| Sn | 1 | 3 | 17 | 43 |
|---|---|---|---|---|
| KA | 1.0000000E+00 | 1.0000000E+00 | 1.0000000E+00 | 1.0000000E+00 |
| A4 | 2.4074094E−06 | −2.9095355E−07 | 4.3331470E−07 | 3.5158499E−06 |
| A6 | −8.8381571E−10 | −6.6801666E−10 | 5.3816040E−12 | −9.7576026E−10 |
| A8 | 1.5130610E−13 | 2.2215613E−12 | 1.9714745E−13 | 1.6607549E−12 |
| A10 | 4.9398185E−18 | −8.4723249E−16 | −4.6997546E−17 | −2.9832219E−15 |

Figure 3:
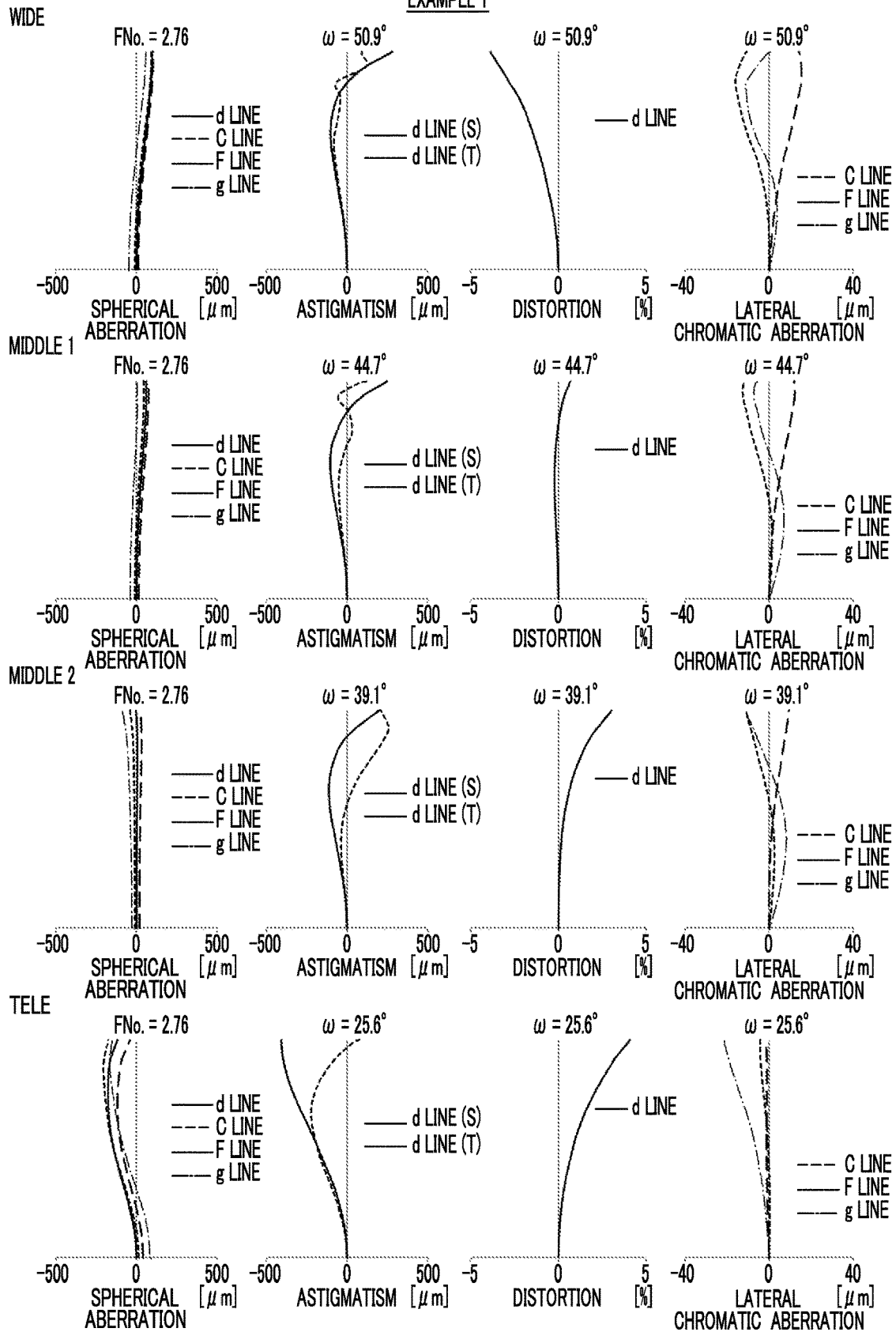
FIG. 3 is each aberration diagram of the zoom lens of Example 1.

FIG. 3 illustrates each aberration diagram of the zoom lens of Example 1 in a state where the object at infinity is focused. In FIG. 3, spherical aberration, astigmatism, distortion, and lateral chromatic aberration are illustrated in order from the left. In FIG. 3, aberration in the wide angle end state is illustrated in an uppermost part denoted by "WIDE", aberration in the first middle focal length state is illustrated in a second part denoted by "MIDDLE1" from the top, aberration in the second middle focal length state is illustrated in a third part denoted by "MIDDLE2" from the top, and aberration in the telephoto end state is illustrated in a lowermost part denoted by "TELE". In the spherical aberration diagram, aberration on the d line, a C line, the F line, and the g line is illustrated by a solid line, a long broken line, a short broken line, and a one-dot chain line, respectively. In the astigmatism diagram, aberration on the d line in a sagittal direction is illustrated by a solid line, and aberration on the d line in a tangential direction is illustrated by a short broken line. In the distortion diagram, aberration on the d line is illustrated by a solid line. In the lateral chromatic aberration diagram, aberration on the C line, the F line, and the g line is illustrated by a long broken line, a short broken line, and a one-dot chain line, respectively. In the spherical aberration diagram, FNo. means the F number. In the other aberration diagrams, ω means a half angle of view.

Symbols, meanings, writing methods, and illustration methods of each data related to Example 1 are the same in the following examples unless otherwise specified. Thus, duplicate descriptions will be omitted below.

Example 2

Figure 4:
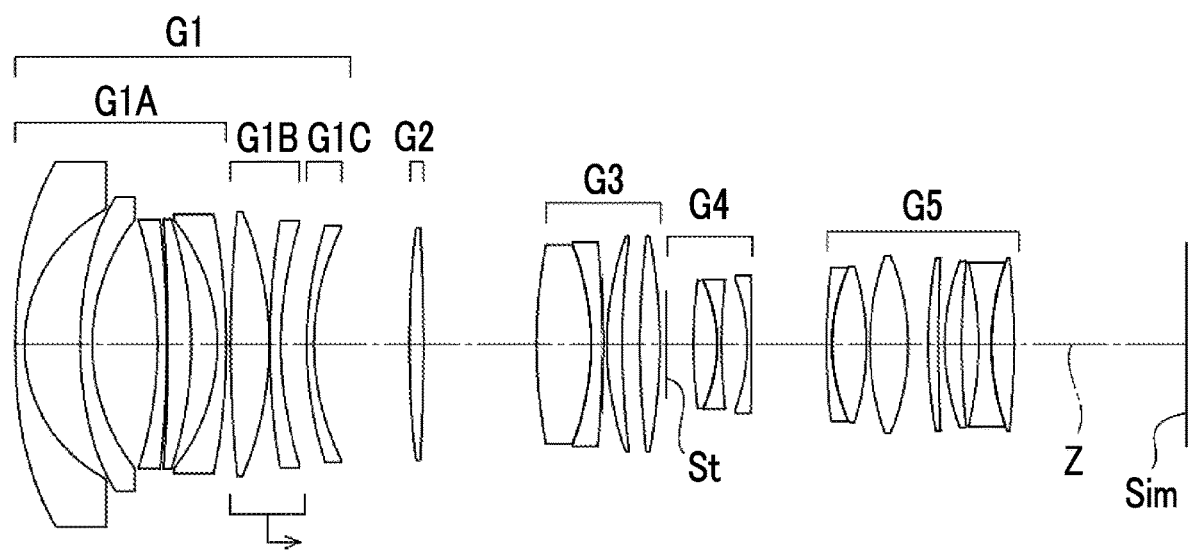
FIG. 4 is a diagram illustrating a cross-sectional configuration and a movement trajectory of a zoom lens of Example 2.
Figure 5:
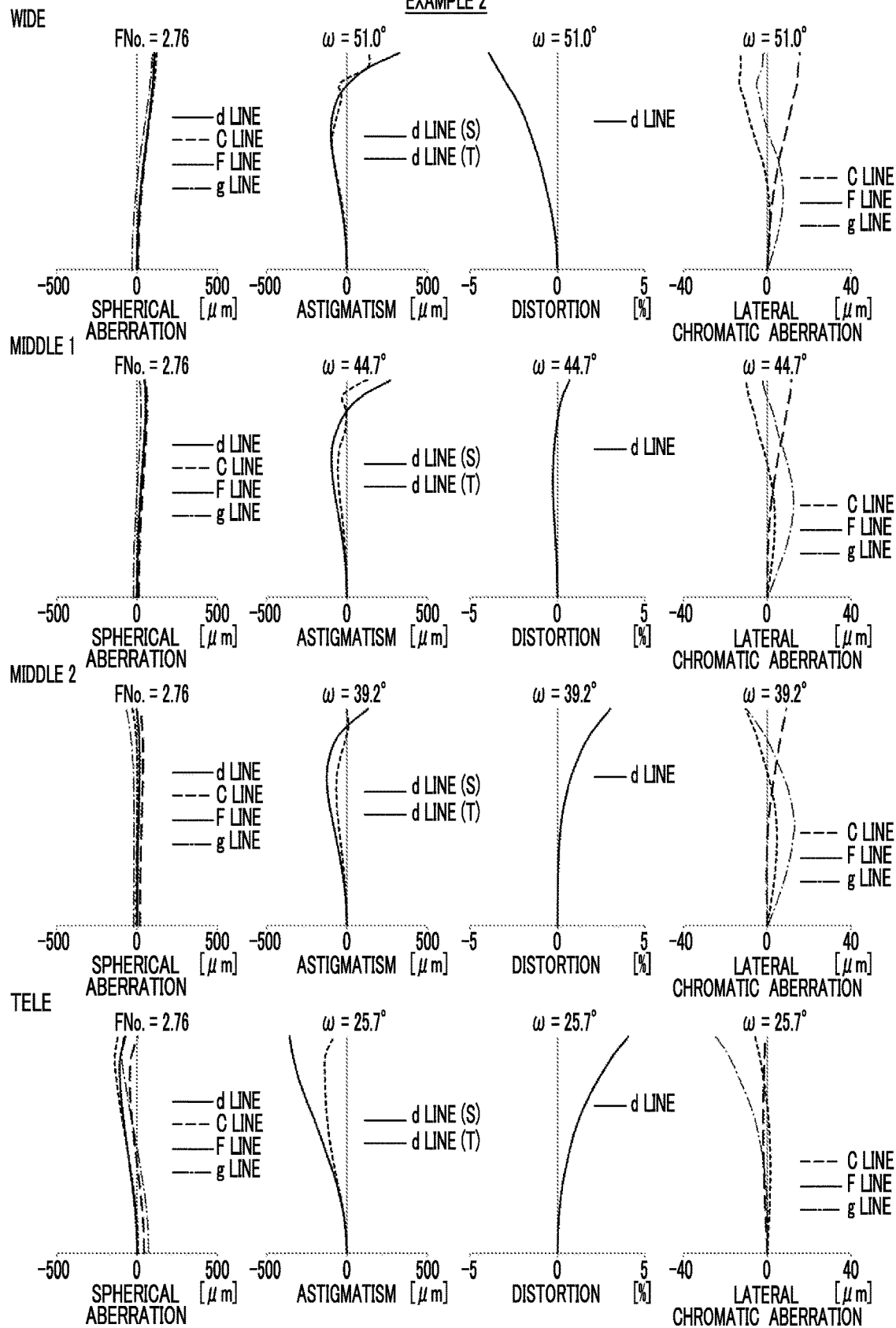
FIG. 5 is each aberration diagram of the zoom lens of Example 2.

A configuration and a movement trajectory of a zoom lens of Example 2 are illustrated in FIG. 4. In FIG. 4 compared to FIG. 1, a configuration at the telephoto end is not illustrated, and this point also applies to configuration diagrams of Examples 3 to 7 below. For the zoom lens of Example 2, fundamental lens data is shown in Table 4A and Table 4B, specifications and variable surface intervals are shown in Table 5, aspherical coefficients are shown in Table 6, and each aberration diagram is illustrated in FIG. 5.

TABLE 4A

Example 2

| Sn | R | D | Nd | vd | θgF | Material |
|---|---|---|---|---|---|---|
| *1 | 188.2961 | 2.0000 | 1.80610 | 33.27 | 0.58845 | NBFD15-W.HOYA |
| 2 | 35.8781 | 12.4700 | | | | |
| *3 | 84.5142 | 2.6800 | 1.72916 | 54.68 | 0.54451 | S-LAL18.OHARA |
| 4 | 48.2192 | 14.6600 | | | | |
| 5 | −97.7775 | 2.0000 | 1.77250 | 49.60 | 0.55212 | S-LAH66.OHARA |
| 6 | −299.2576 | 0.3700 | | | | |
| 7 | −385.1437 | 5.0800 | 1.84666 | 23.78 | 0.62054 | S-TIH53W.OHARA |
| 8 | −96.3493 | 5.8800 | | | | |
| 9 | −47.4028 | 2.0000 | 1.43700 | 95.10 | 0.53364 | FCD100.HOYA |
| 10 | −161.5505 | 0.9500 | | | | |
| 11 | 303.2806 | 8.6600 | 1.60863 | 46.60 | 0.56787 | N-BAF52.SCHOTT |
| 12 | −81.3321 | 0.1200 | | | | |
| 13 | 178.4730 | 2.5000 | 1.89286 | 20.36 | 0.63944 | S-NPH4.OHARA |
| 14 | 92.1468 | 5.9700 | | | | |
| 15 | 91.9662 | 1.6300 | 1.67270 | 32.18 | 0.59733 | J-SF5.HIKARI |
| 16 | 60.9539 | DD[16] | | | | |
| *17 | 305.4093 | 3.2300 | 1.88300 | 40.76 | 0.56679 | S-LAH58.OHARA |
| 18 | −513.7363 | DD[18] | | | | |
| 19 | 123.2744 | 12.5100 | 1.63246 | 63.77 | 0.54215 | K-LAFK60.SUMITA |
| 20 | −62.4574 | 2.1800 | 1.85150 | 40.78 | 0.56958 | S-LAH89.OHARA |
| 21 | −268.6121 | 0.8200 | | | | |
| 22 | 76.1308 | 3.4300 | 1.49700 | 81.61 | 0.53887 | FCD1.HOYA |
| 23 | 204.2613 | 3.9200 | | | | |
| 24 | 210.8688 | 4.4300 | 1.49700 | 81.61 | 0.53887 | FCD1.HOYA |
| 25 | −138.7302 | DD[25] | | | | |

TABLE 4B

Example 2

| Sn | R | D | Nd | vd | θgF | Material |
|---|---|---|---|---|---|---|
| 26 (St) | ∞ | 6.0900 | | | | |
| 27 | 124.6604 | 5.2400 | 1.84666 | 23.78 | 0.62054 | S-TIH53W.OHARA |
| 28 | −36.7979 | 1.0000 | 1.88300 | 40.76 | 0.56679 | S-LAH58.OHARA |
| 29 | 135.0449 | 5.7600 | | | | |
| 30 | −42.5489 | 1.0000 | 1.90043 | 37.37 | 0.57668 | TAFD37A.HOYA |
| 31 | −650.5453 | DD[31] | | | | |
| 32 | 155.3895 | 1.2400 | 1.85545 | 36.60 | 0.57920 | H-ZLAF3.CDGM |
| 33 | 44.8075 | 7.6800 | 1.55215 | 71.99 | 0.54103 | K-PSK500.SUMITA |
| 34 | −61.6663 | 0.7900 | | | | |
| 35 | 62.8108 | 8.6700 | 1.49700 | 81.61 | 0.53887 | FCD1.HOYA |
| 36 | −55.4069 | 4.5000 | | | | |
| 37 | 118.1316 | 2.2300 | 1.51760 | 63.54 | 0.53369 | K-PBK40.SUMITA |
| 38 | 374.9675 | 1.4500 | | | | |
| 39 | 56.0112 | 3.7700 | 1.43700 | 95.10 | 0.53364 | FCD100.HOYA |
| 40 | 182.3245 | 3.7800 | | | | |
| 41 | −79.6282 | 2.9600 | 1.85000 | 27.03 | 0.60935 | J-LASFH23.HIKARI |
| 42 | 58.7664 | 5.1000 | 1.43700 | 95.10 | 0.53364 | FCD100.HOYA |
| *43 | −131.1738 | 38.6600 | | | | |

TABLE 5

Example 2

| | WIDE | MIDDLE1 | MIDDLE2 | TELE |
|---|---|---|---|---|
| Zr | 1.0 | 1.2 | 1.4 | 2.4 |
| f | 19.74 | 23.46 | 27.87 | 46.78 |
| Bf | 38.66 | 38.66 | 38.66 | 38.66 |
| FNo. | 2.76 | 2.76 | 2.76 | 2.76 |
| 2ω (°) | 102.0 | 89.4 | 78.4 | 51.4 |
| Y | 23.15 | 23.15 | 23.15 | 23.15 |
| DD[16] | 21.38 | 13.62 | 8.75 | 5.83 |

TABLE 5-continued

Example 2

| | WIDE | MIDDLE1 | MIDDLE2 | TELE |
|---|---|---|---|---|
| DD[18] | 25.23 | 24.50 | 21.51 | 0.66 |
| DD[25] | 1.50 | 12.02 | 22.84 | 57.45 |
| DD[31] | 16.75 | 14.72 | 11.76 | 0.93 |

TABLE 6

| | Example 2 | | | |
|---|---|---|---|---|
| Sn | 1 | 3 | 17 | 43 |
| KA | 1.0000000E+00 | 1.0000000E+00 | 1.0000000E+00 | 1.0000000E+00 |
| A4 | 2.4586033E−06 | −3.6347010E−07 | 4.1898578E−07 | 3.4257774E−06 |
| A6 | −1.0394013E−09 | −7.9460493E−11 | 9.4106959E−11 | 8.0443277E−10 |
| A8 | 2.5170326E−13 | 1.6305349E−12 | 5.3400053E−14 | −3.0116784E−12 |
| A10 | −1.4254041E−17 | −7.0072071E−16 | 4.7776641E−17 | 2.4584265E−15 |

Example 3

Figure 6:
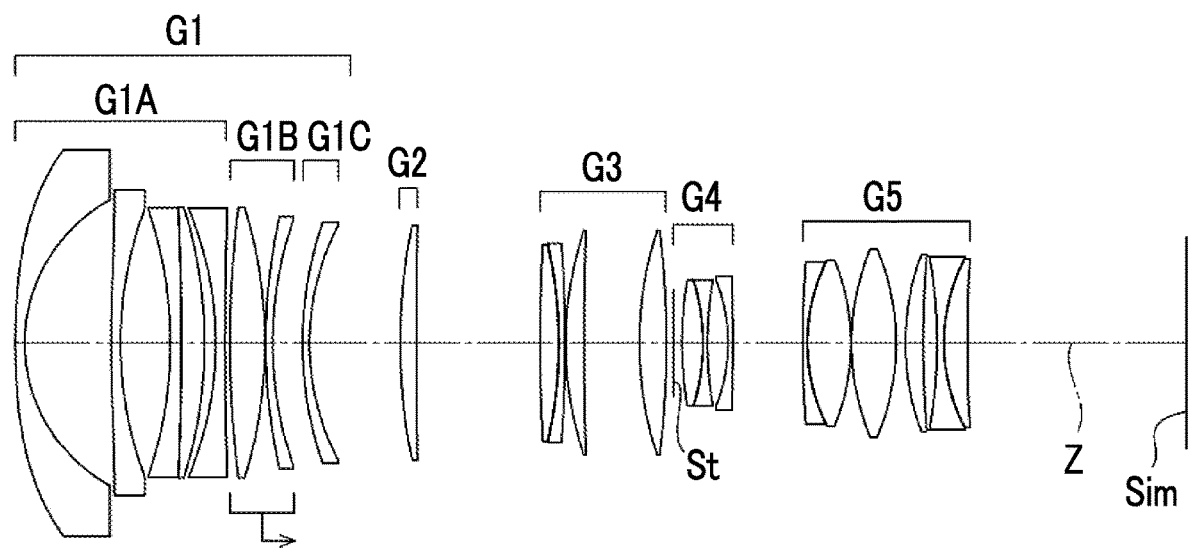
FIG. 6 is a diagram illustrating a cross-sectional configuration and a movement trajectory of a zoom lens of Example 3.
Figure 7:
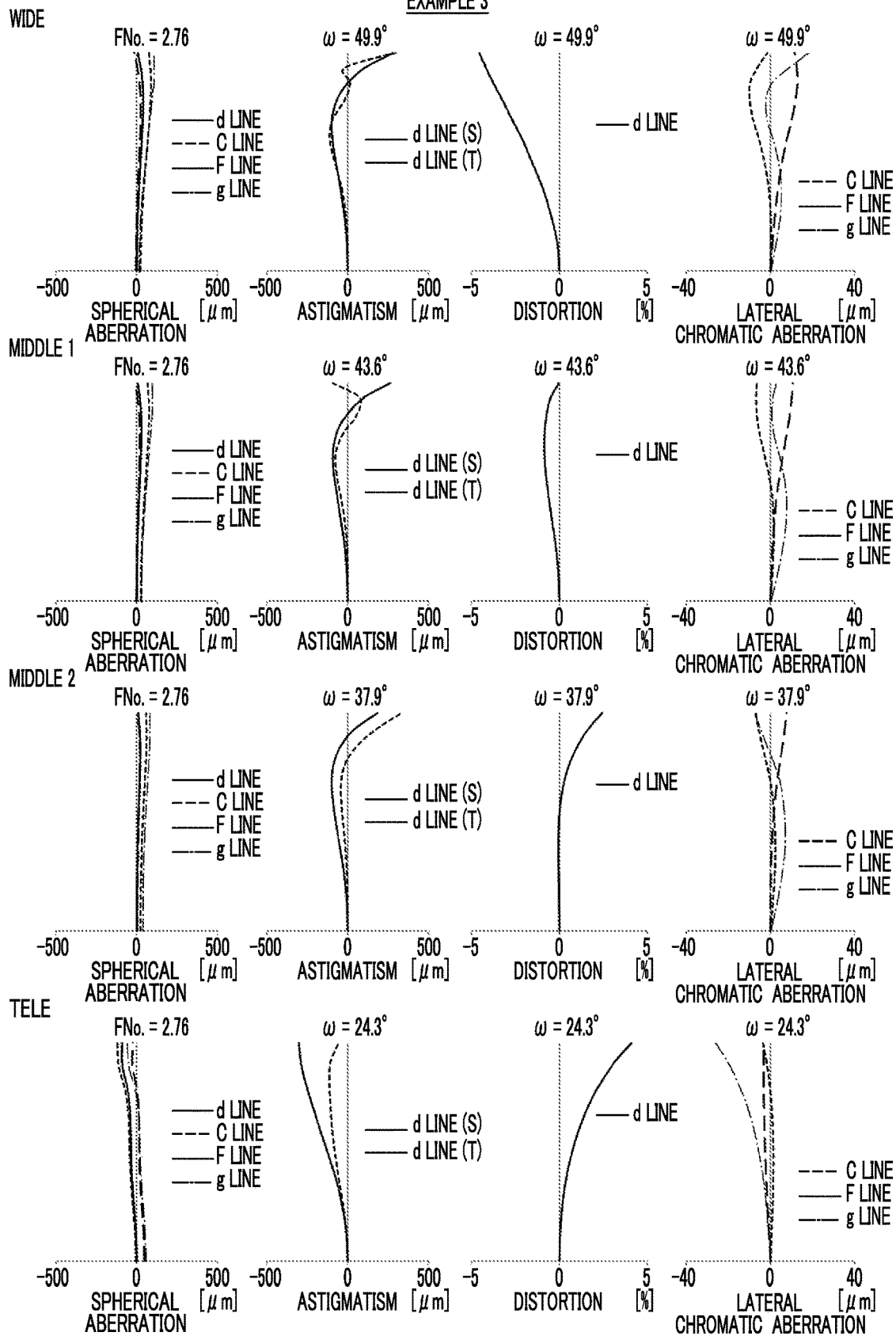
FIG. 7 is each aberration diagram of the zoom lens of Example 3.

A configuration and a movement trajectory of a zoom lens of Example 3 are illustrated in FIG. 6. For the zoom lens of Example 3, fundamental lens data is shown in Table 7A and Table 7B, specifications and variable surface intervals are shown in Table 8, aspherical coefficients are shown in Table 9, and each aberration diagram is illustrated in FIG. 7.

TABLE 7A

| | Example 3 | | | | |
|---|---|---|---|---|---|
| Sn | R | D | Nd | νd | θgF |
| *1 | 172.5204 | 1.9900 | 1.73687 | 54.31 | 0.54489 |
| 2 | 36.8252 | 18.6800 | | | |
| *3 | 363.9507 | 1.9900 | 1.75873 | 27.06 | 0.61189 |
| 4 | 87.7787 | 10.7400 | | | |
| 5 | −95.1319 | 2.3700 | 1.73236 | 44.94 | 0.56390 |
| 6 | −699.6016 | 5.0200 | 1.83397 | 24.86 | 0.61790 |
| 7 | −102.9688 | 2.3500 | | | |
| 8 | −79.3675 | 2.0600 | 1.43700 | 95.10 | 0.53364 |
| 9 | 1035.9376 | 1.0000 | | | |
| 10 | 243.8766 | 7.6100 | 1.62987 | 35.84 | 0.58887 |
| 11 | −105.1805 | 0.1200 | | | |
| 12 | 132.7839 | 1.5000 | 1.89950 | 21.48 | 0.63500 |
| 13 | 84.8779 | 6.6200 | | | |
| 14 | 85.1762 | 1.4900 | 1.75048 | 27.52 | 0.61059 |
| 15 | 58.2589 | DD[15] | | | |
| *16 | 147.8038 | 3.4200 | 1.88300 | 40.76 | 0.56679 |
| 17 | 1636.9330 | DD[17] | | | |
| 18 | 440.5701 | 4.0000 | 1.58112 | 61.88 | 0.54188 |
| 19 | −104.3743 | 1.3700 | 1.85000 | 27.03 | 0.60935 |
| 20 | −310.4428 | 0.1100 | | | |
| 21 | 81.7400 | 4.1300 | 1.49700 | 81.61 | 0.53887 |
| 22 | 848.0321 | 11.6700 | | | |
| 23 | 83.3225 | 5.8600 | 1.49700 | 81.61 | 0.53887 |
| 24 | −214.0866 | DD[24] | | | |

TABLE 7B

| | Example 3 | | | | |
|---|---|---|---|---|---|
| Sn | R | D | Nd | νd | θgF |
| 25 (St) | ∞ | 1.8600 | | | |
| 26 | 88.9250 | 4.4900 | 1.84652 | 22.70 | 0.62829 |
| 27 | −48.0783 | 1.0000 | 1.86406 | 41.59 | 0.56702 |
| 28 | 85.4545 | 4.4100 | | | |
| 29 | −39.1651 | 1.0000 | 1.90000 | 38.00 | 0.57547 |
| 30 | −648.3566 | DD[30] | | | |
| 31 | 242.2043 | 0.9900 | 1.83039 | 43.31 | 0.56401 |
| 32 | 42.4613 | 9.4000 | 1.59282 | 68.62 | 0.54414 |
| 33 | −49.4972 | 0.1100 | | | |
| 34 | 56.3577 | 9.7600 | 1.49700 | 81.61 | 0.53887 |
| 35 | −54.9337 | 2.0000 | | | |
| 36 | 58.4487 | 3.8100 | 1.58643 | 61.68 | 0.54215 |
| 37 | 241.1359 | 2.9900 | | | |
| 38 | −115.7992 | 1.4900 | 1.80000 | 29.84 | 0.60178 |
| 39 | 41.5952 | 5.1700 | 1.43700 | 95.10 | 0.53364 |
| *40 | 5873.8931 | 47.3400 | | | |

TABLE 8

| | Example 3 | | | |
|---|---|---|---|---|
| | WIDE | MIDDLE1 | MIDDLE2 | TELE |
| Zr | 1.0 | 1.2 | 1.4 | 2.4 |
| f | 20.64 | 24.61 | 29.35 | 49.75 |
| Bf | 47.34 | 47.34 | 47.34 | 47.34 |
| FNo. | 2.76 | 2.76 | 2.76 | 2.76 |
| 2ω (°) | 99.8 | 87.2 | 75.8 | 48.6 |
| Y | 23.15 | 23.15 | 23.15 | 23.15 |
| DD[15] | 19.61 | 12.35 | 7.90 | 4.85 |
| DD[17] | 26.70 | 25.35 | 21.60 | 0.97 |
| DD[24] | 1.49 | 11.90 | 22.53 | 55.74 |
| DD[30] | 15.11 | 13.31 | 10.88 | 1.35 |

TABLE 9

| | Example 3 | | | |
|---|---|---|---|---|
| Sn | 1 | 3 | 16 | 40 |
| KA | 1.0000000E+00 | 1.0000000E+00 | 1.0000000E+00 | 1.0000000E+00 |
| A4 | 1.8474103E−06 | −7.3163272E−07 | 4.2073735E−07 | 3.5982688E−06 |
| A6 | −4.5161310E−10 | 8.9393268E−11 | 2.3933164E−11 | 2.0335853E−09 |
| A8 | 1.1851298E−13 | 6.0802640E−14 | 2.8464856E−13 | −4.1062709E−12 |
| A10 | 2.6486862E−18 | −9.4806063E−17 | −1.3886919E−16 | 6.2255034E−15 |

Example 4

Figure 8:
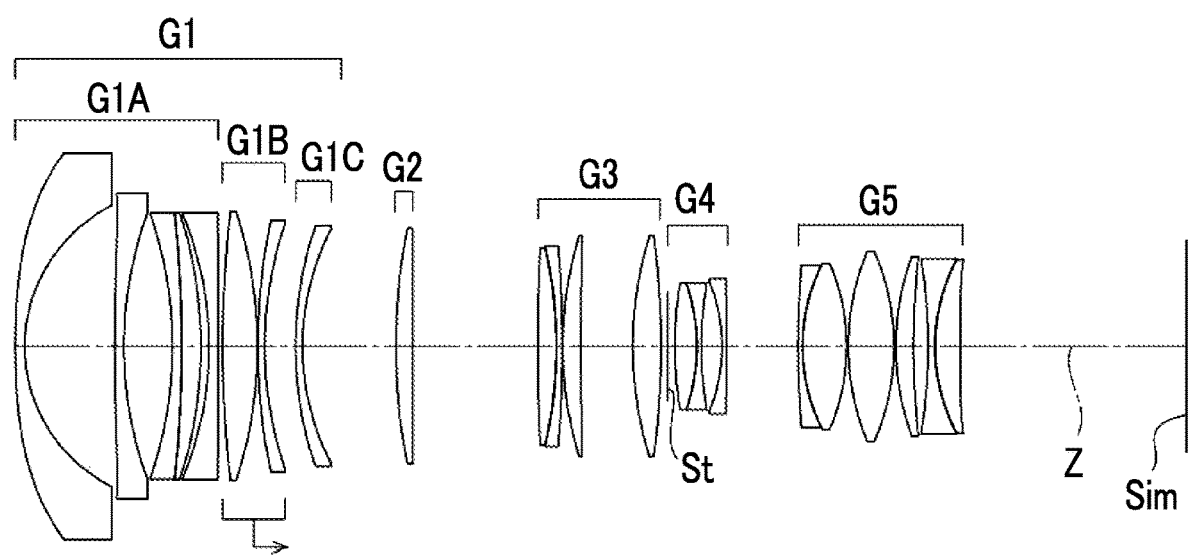
FIG. 8 is a diagram illustrating a cross-sectional configuration and a movement trajectory of a zoom lens of Example 4.
Figure 9:
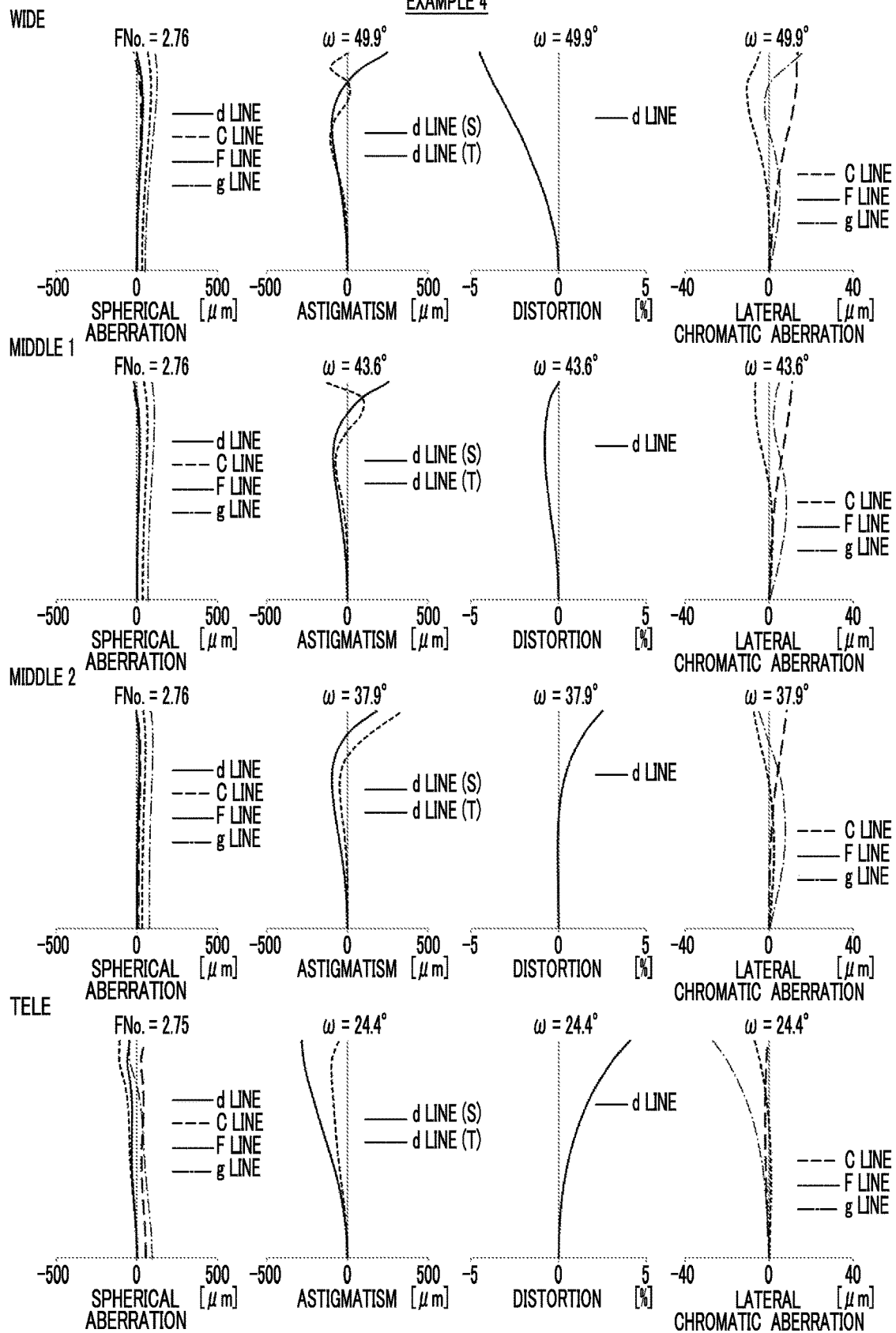
FIG. 9 is each aberration diagram of the zoom lens of Example 4.

A configuration and a movement trajectory of a zoom lens of Example 4 are illustrated in FIG. 8. For the zoom lens of Example 4, fundamental lens data is shown in Table 10A and Table 10B, specifications and variable surface intervals are shown in Table 11, aspherical coefficients are shown in Table 12, and each aberration diagram is illustrated in FIG. 9.

TABLE 10A

Example 4

| Sn | R | D | Nd | vd | θgF | Material |
|---|---|---|---|---|---|---|
| *1 | 184.3774 | 2.0100 | 1.72916 | 54.68 | 0.54451 | S-LAL18.OHARA |
| 2 | 35.6392 | 19.4000 | | | | |
| *3 | 371.4261 | 1.9900 | 1.73800 | 32.33 | 0.59005 | S-NBH53V.OHARA |
| 4 | 89.0648 | 10.4800 | | | | |
| 5 | −93.6294 | 2.0200 | 1.69560 | 59.05 | 0.54348 | K-LAFK58.SUMITA |
| 6 | −281.0081 | 4.1000 | 1.80518 | 25.46 | 0.61572 | FD6O-W.HOYA |
| 7 | −99.3089 | 1.7800 | | | | |
| 8 | −78.8307 | 2.0000 | 1.43700 | 95.10 | 0.53364 | FCD100.HOYA |
| 9 | −3680.6120 | 0.9600 | | | | |
| 10 | 273.5015 | 7.4400 | 1.61266 | 44.46 | 0.56403 | J-KZFH1.HIKARI |
| 11 | −101.3894 | 0.1200 | | | | |
| 12 | 141.5759 | 1.5000 | 1.84666 | 23.78 | 0.61923 | FDS90-SG.HOYA |
| 13 | 87.5717 | 6.8000 | | | | |
| 14 | 86.3277 | 1.4900 | 1.72825 | 28.46 | 0.60772 | S-TIH10.OHARA |
| 15 | 58.4581 | DD[15] | | | | |
| *16 | 156.2887 | 3.5300 | 1.88300 | 40.76 | 0.56679 | S-LAH58.OHARA |
| 17 | 5784.3092 | DD[17] | | | | |
| 18 | 512.4732 | 3.9400 | 1.55232 | 63.46 | 0.53656 | N-PSK3.SCHOTT |
| 19 | −103.7383 | 1.2900 | 1.85000 | 27.03 | 0.60935 | J-LASFH23.HIKARI |
| 20 | −270.9544 | 0.1200 | | | | |
| 21 | 88.4798 | 3.9600 | 1.49700 | 81.61 | 0.53887 | FCD1.HOYA |
| 22 | 1123.1481 | 10.9900 | | | | |
| 23 | 84.8613 | 6.1300 | 1.49700 | 81.61 | 0.53887 | FCD1.HOYA |
| 24 | −187.7387 | DD[24] | | | | |

TABLE 10B

Example 4

| Sn | R | D | Nd | vd | θgF | Material |
|---|---|---|---|---|---|---|
| 25 (St) | ∞ | 1.5000 | | | | |
| 26 | 87.7166 | 4.7200 | 1.84666 | 23.78 | 0.61923 | FDS90-SG.HOYA |
| 27 | −45.4567 | 0.9900 | 1.84850 | 43.79 | 0.56197 | J-LASFH22.HIKARI |
| 28 | 85.0223 | 4.4400 | | | | |
| 29 | −39.3271 | 1.0000 | 1.90043 | 37.37 | 0.57720 | TAFD37.HOYA |
| 30 | −696.1199 | DD[30] | | | | |
| 31 | 228.8212 | 1.0000 | 1.84850 | 43.79 | 0.56197 | J-LASFH22.HIKARI |
| 32 | 42.4855 | 9.4700 | 1.59282 | 68.62 | 0.54414 | FCD515.HOYA |
| 33 | −48.9037 | 0.3800 | | | | |
| 34 | 56.7175 | 9.9900 | 1.49700 | 81.61 | 0.53887 | FCD1.HOYA |
| 35 | −54.1103 | 0.3700 | | | | |
| 36 | 58.9077 | 3.8500 | 1.56384 | 60.67 | 0.54030 | S-BAL41.OHARA |
| 37 | 189.3886 | 3.1100 | | | | |
| 38 | −127.1766 | 1.4900 | 1.80000 | 29.84 | 0.60178 | S-NBH55.OHARA |
| 39 | 42.2876 | 5.4700 | 1.43700 | 95.10 | 0.53364 | FCD100.HOYA |
| *40 | 3581.1101 | 48.9900 | | | | |

TABLE 11

Example 4

| | WIDE | MIDDLE1 | MIDDLE2 | TELE |
|---|---|---|---|---|
| Zr | 1.0 | 1.2 | 1.4 | 2.4 |
| f | 20.63 | 24.60 | 29.33 | 49.72 |
| Bf | 48.99 | 48.99 | 48.99 | 48.99 |
| FNo. | 2.76 | 2.76 | 2.76 | 2.75 |
| 2ω (°) | 99.8 | 87.2 | 75.8 | 48.6 |
| Y | 23.15 | 23.15 | 23.15 | 23.15 |
| DD[15] | 20.17 | 12.67 | 8.10 | 4.90 |
| DD[17] | 27.04 | 25.60 | 21.78 | 0.96 |
| DD[24] | 1.50 | 12.11 | 22.94 | 56.79 |
| DD[30] | 15.39 | 13.72 | 11.28 | 1.45 |

TABLE 12

| | Example 4 | | | |
|---|---|---|---|---|
| Sn | 1 | 3 | 16 | 40 |
| KA | 1.0000000E+00 | 1.0000000E+00 | 1.0000000E+00 | 1.0000000E+00 |
| A4 | 2.1645021E−06 | −1.0672842E−06 | 4.9202486E−07 | 3.5270396E−06 |
| A6 | −6.4790574E−10 | 2.5570065E−10 | 1.2783699E−11 | 2.0385787E−09 |
| A8 | 1.9634072E−13 | 9.0587816E−14 | 2.9844331E−13 | −4.2307857E−12 |
| A10 | −1.1436183E−17 | −1.2629887E−16 | −1.3930836E−16 | 6.4310632E−15 |

Example 5

Figure 10:
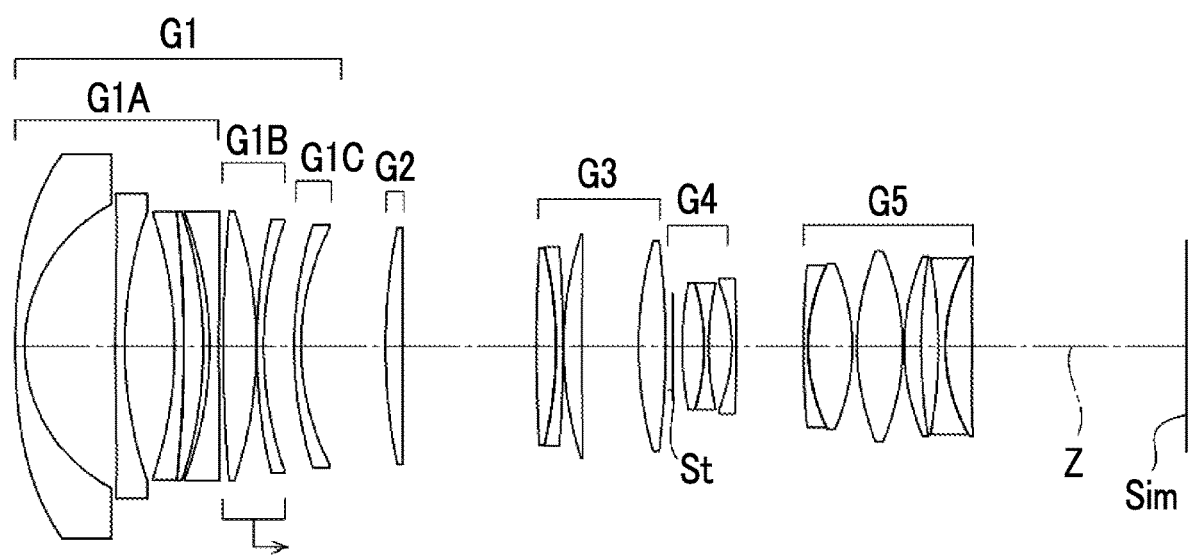
FIG. 10 is a diagram illustrating a cross-sectional configuration and a movement trajectory of a zoom lens of Example 5.
Figure 11:
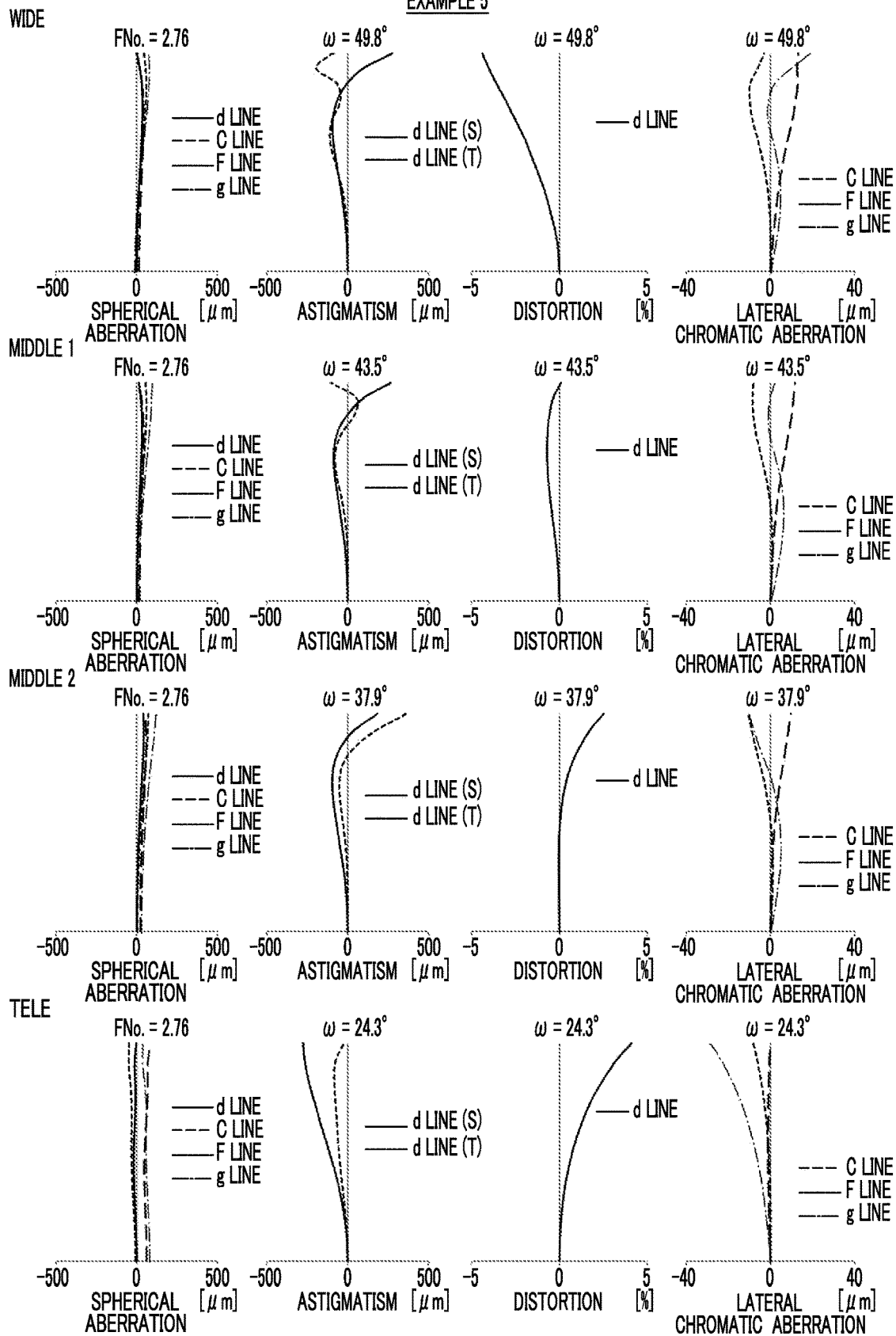
FIG. 11 is each aberration diagram of the zoom lens of Example 5.

A configuration and a movement trajectory of a zoom lens of Example 5 are illustrated in FIG. 10. For the zoom lens of Example 5, fundamental lens data is shown in Table 13A and Table 13B, specifications and variable surface intervals are shown in Table 14, aspherical coefficients are shown in Table 15, and each aberration diagram is illustrated in FIG. 11.

TABLE 13A

| | | | Example 5 | | | |
|---|---|---|---|---|---|---|
| Sn | R | D | Nd | vd | θgF | Material |
| *1 | 179.7778 | 1.9900 | 1.72916 | 54.68 | 0.54451 | S-LAL18.OHARA |
| 2 | 36.2146 | 19.6800 | | | | |
| *3 | 577.0622 | 1.9900 | 1.73800 | 32.33 | 0.59005 | S-NBH53V.OHARA |
| 4 | 95.1814 | 10.8100 | | | | |
| 5 | −95.6803 | 2.0100 | 1.69560 | 59.05 | 0.54348 | K-LAFK58.SUMITA |
| 6 | −284.8530 | 4.1600 | 1.80518 | 25.46 | 0.61572 | FD6O-W.HOYA |
| 7 | −99.0506 | 1.3800 | | | | |
| 8 | −84.1693 | 1.9900 | 1.48563 | 85.19 | 0.53858 | K-PFK85.SUMITA |
| 9 | 2238.1411 | 0.9700 | | | | |
| 10 | 374.9417 | 7.0900 | 1.61266 | 44.46 | 0.56403 | J-KZFH1.HIKARI |
| 11 | −98.7373 | 0.1200 | | | | |
| 12 | 129.7476 | 1.5000 | 1.84666 | 23.78 | 0.61923 | FDS90-SG.HOYA |
| 13 | 88.3782 | 6.7000 | | | | |
| 14 | 92.4493 | 1.4900 | 1.72825 | 28.46 | 0.60772 | S-TIH10.OHARA |
| 15 | 59.4967 | DD[15] | | | | |
| *16 | 151.9165 | 3.5800 | 1.88300 | 40.76 | 0.56679 | S-LAH58.OHARA |
| 17 | ∞ | DD[17] | | | | |
| 18 | 365.6138 | 4.2300 | 1.55232 | 63.46 | 0.53656 | N-PSK3.SCHOTT |
| 19 | −99.3381 | 1.5300 | 1.85000 | 27.03 | 0.60935 | J-LASFH23.HIKARI |
| 20 | −284.5116 | 0.1100 | | | | |
| 21 | 85.1456 | 4.0300 | 1.49700 | 81.61 | 0.53887 | FCD1.HOYA |
| 22 | 1083.7656 | 12.0600 | | | | |
| 23 | 88.0518 | 5.8800 | 1.49700 | 81.61 | 0.53887 | FCD1.HOYA |
| 24 | −189.1913 | DD[24] | | | | |

TABLE 13B

| | | | Example 5 | | | |
|---|---|---|---|---|---|---|
| Sn | R | D | Nd | vd | θgF | Material |
| 25 (St) | ∞ | 2.0900 | | | | |
| 26 | 74.4604 | 4.7400 | 1.84666 | 23.78 | 0.61923 | FDS90-SG.HOYA |
| 27 | −50.0784 | 1.0000 | 1.84850 | 43.79 | 0.56197 | J-LASFH22.HIKARI |
| 28 | 67.5990 | 4.9600 | | | | |
| 29 | −37.1247 | 1.0000 | 1.90043 | 37.37 | 0.57720 | TAFD37.HOYA |
| 30 | −401.4263 | DD[30] | | | | |
| 31 | 210.9690 | 0.9900 | 1.84850 | 43.79 | 0.56197 | J-LASFH22.HIKARI |
| 32 | 42.8396 | 9.6100 | 1.59282 | 68.62 | 0.54414 | FCD515.HOYA |
| 33 | −46.4617 | 0.9200 | | | | |
| 34 | 56.4293 | 9.8900 | 1.49700 | 81.61 | 0.53887 | FCD1.HOYA |
| 35 | −54.5764 | 0.3400 | | | | |
| 36 | 52.3778 | 3.6400 | 1.55298 | 55.07 | 0.54469 | J-KZFH4.HIKARI |
| 37 | 133.1397 | 3.7800 | | | | |
| 38 | −113.6893 | 1.4900 | 1.80000 | 29.84 | 0.60178 | S-NBH55.OHARA |
| 39 | 41.1554 | 5.7000 | 1.43700 | 95.10 | 0.53364 | FCD100.HOYA |
| *40 | −672.3275 | 46.6200 | | | | |

TABLE 14

| | Example 5 | | | |
|---|---|---|---|---|
| | WIDE | MIDDLE1 | MIDDLE2 | TELE |
| Zr | 1.0 | 1.2 | 1.4 | 2.4 |
| f | 20.65 | 24.63 | 29.36 | 49.77 |
| Bf | 46.62 | 46.62 | 46.62 | 46.62 |
| FNo. | 2.76 | 2.76 | 2.76 | 2.75 |
| 2ω (°) | 99.6 | 87.0 | 75.8 | 48.6 |
| Y | 23.15 | 23.15 | 23.15 | 23.15 |
| DD[15] | 18.28 | 11.50 | 7.40 | 4.81 |
| DD[17] | 28.96 | 26.93 | 22.68 | 0.95 |
| DD[24] | 1.50 | 12.07 | 22.80 | 56.19 |
| DD[30] | 14.52 | 12.76 | 10.38 | 1.31 |

TABLE 15

| | Example 5 | | | |
|---|---|---|---|---|
| Sn | 1 | 3 | 16 | 40 |
| KA | 1.0000000E+00 | 1.0000000E+00 | 1.0000000E+00 | 1.0000000E+00 |
| A4 | 2.0150498E−06 | −9.3752002E−07 | 4.7279292E−07 | 3.4773531E−06 |
| A6 | −5.7179628E−10 | 2.1079163E−10 | 4.1550744E−11 | 1.5790207E−09 |
| A8 | 1.5575834E−13 | 1.9556263E−13 | 1.9137696E−13 | −3.8694631E−12 |
| A10 | −6.3945280E−18 | −1.6980326E−16 | −5.0303114E−17 | 5.7228925E−15 |

Example 6

Figure 12:
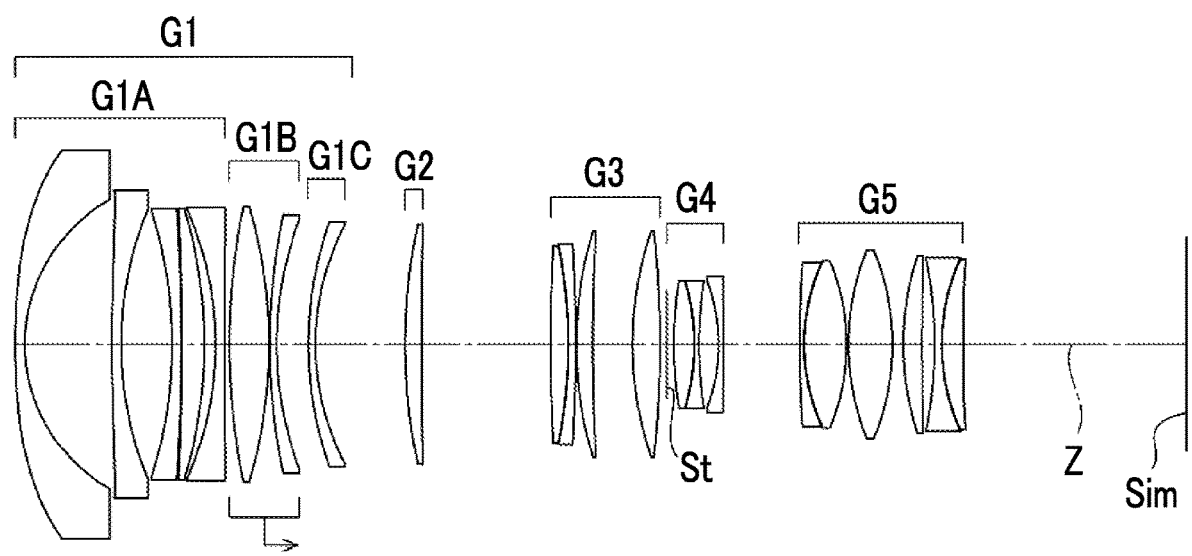
FIG. 12 is a diagram illustrating a cross-sectional configuration and a movement trajectory of a zoom lens of Example 6.
Figure 13:
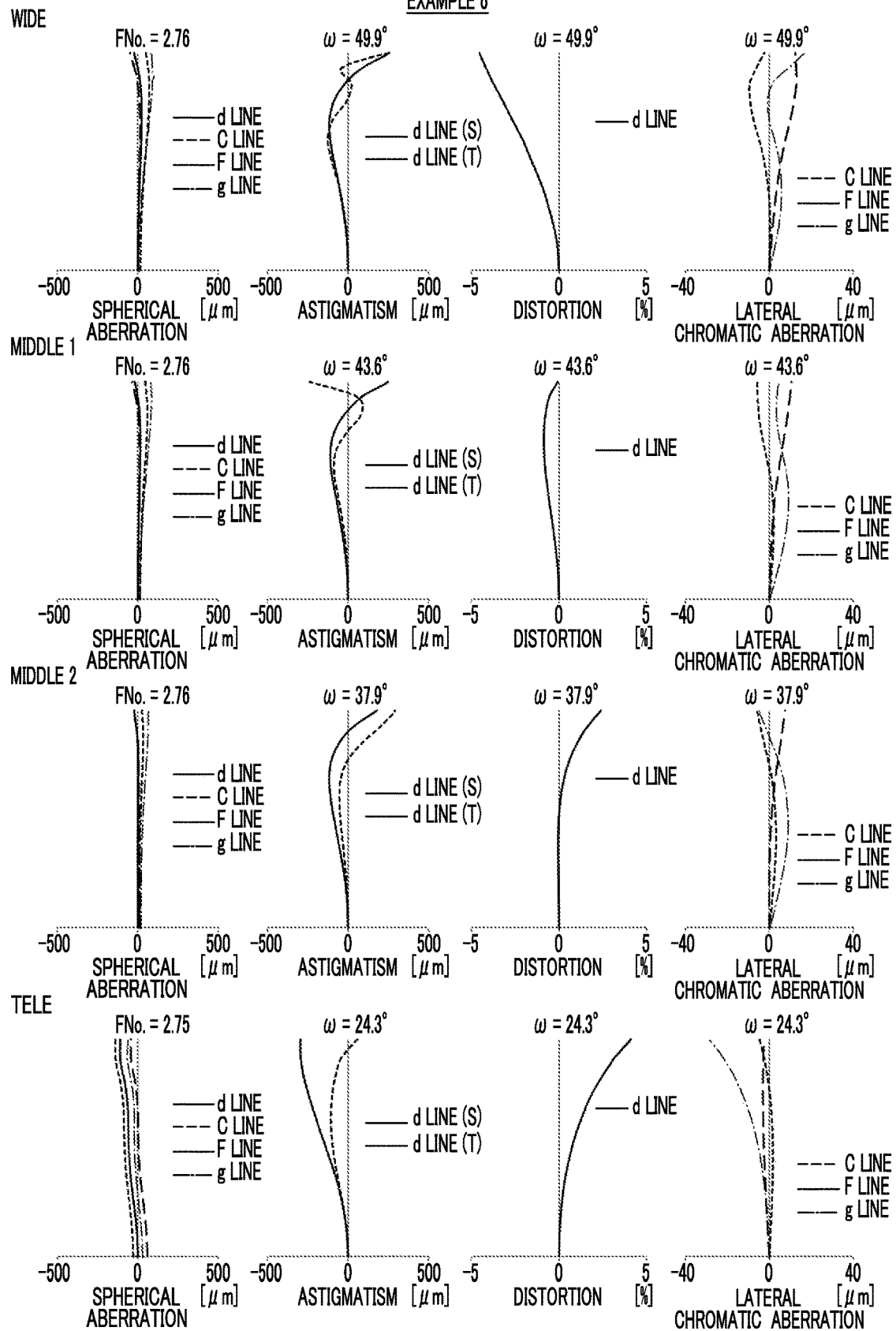
FIG. 13 is each aberration diagram of the zoom lens of Example 6.

A configuration and a movement trajectory of a zoom lens of Example 6 are illustrated in FIG. 12. For the zoom lens of Example 6, fundamental lens data is shown in Table 16A and Table 16B, specifications and variable surface intervals are shown in Table 17, aspherical coefficients are shown in Table 18, and each aberration diagram is illustrated in FIG. 13.

TABLE 16A

| | Example 6 | | | | |
|---|---|---|---|---|---|
| Sn | R | D | Nd | vd | θgF |
| *1 | 184.8835 | 2.0000 | 1.71370 | 55.82 | 0.54372 |
| 2 | 37.2610 | 18.8500 | | | |
| *3 | 405.8269 | 1.9600 | 1.76143 | 27.58 | 0.61012 |
| 4 | 80.7336 | 10.8600 | | | |
| 5 | −100.6377 | 2.0000 | 1.73718 | 54.28 | 0.54493 |
| 6 | −436.6554 | 0.1300 | | | |
| 7 | −656.6560 | 4.7700 | 1.81812 | 24.09 | 0.61940 |
| 8 | −106.3023 | 2.3800 | | | |
| 9 | −75.4683 | 2.0000 | 1.43700 | 95.10 | 0.53364 |
| 10 | 4065.4680 | 0.9700 | | | |
| 11 | 155.4039 | 8.4800 | 1.61236 | 37.91 | 0.58362 |
| 12 | −111.1333 | 0.1100 | | | |
| 13 | 139.9466 | 1.5000 | 1.88198 | 20.90 | 0.63681 |
| 14 | 79.6391 | 6.9300 | | | |
| 15 | 83.3706 | 1.4900 | 1.72330 | 28.83 | 0.60692 |
| 16 | 58.3587 | DD[16] | | | |
| *17 | 140.3543 | 3.4900 | 1.88805 | 39.20 | 0.57251 |
| 18 | 1303.5886 | DD[18] | | | |
| 19 | 463.9747 | 3.8300 | 1.59322 | 61.41 | 0.54245 |
| 20 | −113.7095 | 1.3200 | 1.84459 | 26.97 | 0.61012 |
| 21 | −362.6565 | 0.1200 | | | |
| 22 | 85.0659 | 3.6100 | 1.49700 | 81.61 | 0.53887 |
| 23 | 479.5115 | 8.2000 | | | |
| 24 | 78.7164 | 5.9200 | 1.49700 | 81.61 | 0.53887 |
| 25 | −236.9218 | DD[25] | | | |

TABLE 16B

| | Example 6 | | | | |
|---|---|---|---|---|---|
| Sn | R | D | Nd | vd | θgF |
| 26 (St) | ∞ | 1.5000 | | | |
| 27 | 92.3206 | 4.3600 | 1.84670 | 22.66 | 0.62845 |
| 28 | −50.4925 | 1.0000 | 1.85878 | 42.01 | 0.56615 |
| 29 | 95.1575 | 4.2000 | | | |
| 30 | −41.6829 | 0.9900 | 1.89999 | 37.68 | 0.57636 |
| 31 | −1492.6690 | DD[31] | | | |
| 32 | 243.3999 | 1.0000 | 1.84371 | 40.91 | 0.56935 |
| 33 | 44.9547 | 9.0200 | 1.59282 | 68.62 | 0.54414 |
| 34 | −50.5439 | 0.4200 | | | |
| 35 | 57.2592 | 9.4700 | 1.49700 | 81.61 | 0.53887 |
| 36 | −56.2624 | 2.3700 | | | |
| 37 | 65.6181 | 4.0000 | 1.54858 | 63.13 | 0.53930 |
| 38 | 1000.7342 | 2.7000 | | | |
| 39 | −96.7795 | 1.5000 | 1.79344 | 30.09 | 0.60142 |
| 40 | 47.1173 | 4.6400 | 1.43700 | 95.10 | 0.53364 |
| *41 | 4148.9616 | 47.9900 | | | |

TABLE 17

| | Example 6 | | | |
|---|---|---|---|---|
| | WIDE | MIDDLE1 | MIDDLE2 | TELE |
| Zr | 1.0 | 1.2 | 1.4 | 2.4 |
| f | 20.65 | 24.62 | 29.36 | 49.76 |
| Bf | 47.99 | 47.99 | 47.99 | 47.99 |
| FNo. | 2.76 | 2.76 | 2.76 | 2.76 |
| 2ω (°) | 99.8 | 87.2 | 75.8 | 48.6 |
| Y | 23.15 | 23.15 | 23.15 | 23.15 |
| DD[16] | 19.23 | 12.32 | 7.99 | 4.75 |
| DD[18] | 27.65 | 25.92 | 21.92 | 0.97 |
| DD[25] | 1.50 | 12.16 | 23.12 | 57.53 |
| DD[31] | 16.32 | 14.29 | 11.67 | 1.45 |

TABLE 18

| | Example 6 | | | |
|---|---|---|---|---|
| Sn | 1 | 3 | 17 | 41 |
| KA | 1.0000000E+00 | 1.0000000E+00 | 1.0000000E+00 | 1.0000000E+00 |
| A4 | 1.8580671E−06 | −6.0421948E−07 | 3.4884674E−07 | 3.4669110E−06 |
| A6 | −4.5998264E−10 | −1.4938535E−11 | −3.1009283E−12 | 2.2750145E−09 |
| A8 | 1.2132808E−13 | 1.1399760E−13 | 3.2914025E−13 | −4.7850754E−12 |
| A10 | 2.3698201E−18 | −1.0659965E−16 | −1.7131087E−16 | 6.9927269E−15 |

Example 7

Figure 14:
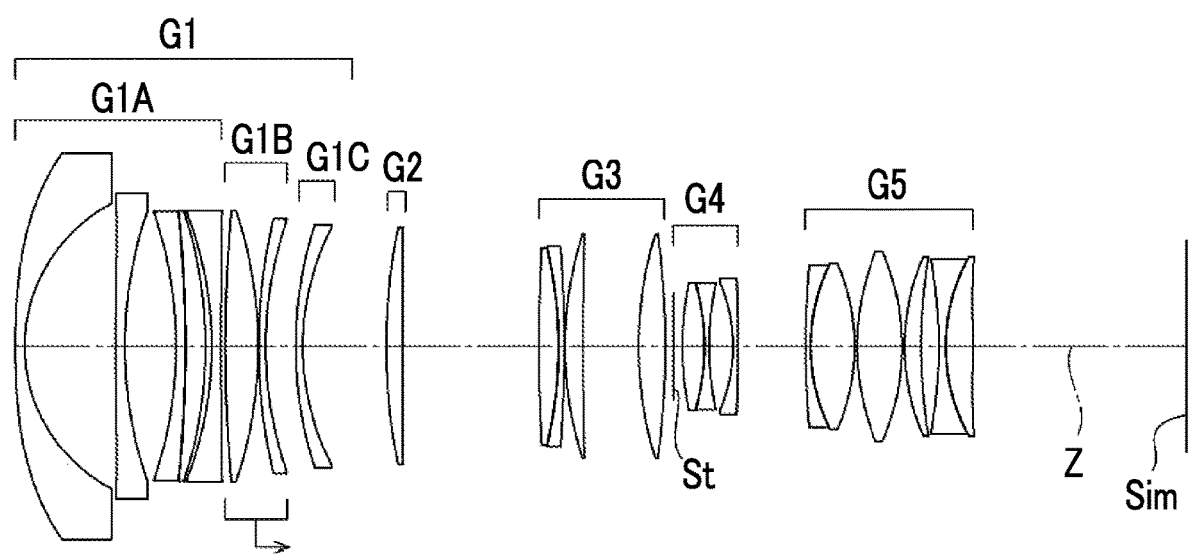
FIG. 14 is a diagram illustrating a cross-sectional configuration and a movement trajectory of a zoom lens of Example 7.
Figure 15:
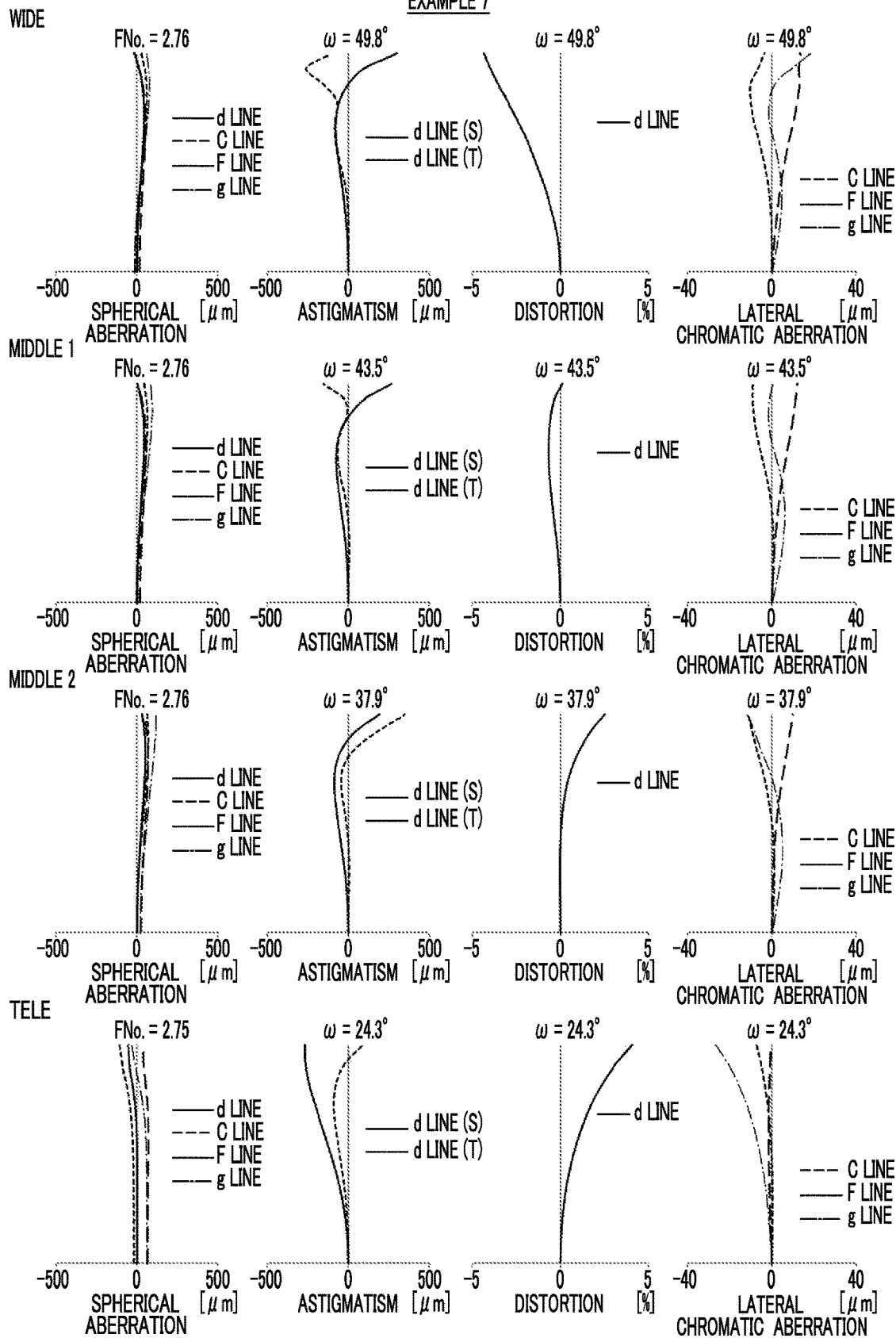
FIG. 15 is each aberration diagram of the zoom lens of Example 7.

A configuration and a movement trajectory of a zoom lens of Example 7 are illustrated in FIG. 14. For the zoom lens of Example 7, fundamental lens data is shown in Table 19A and Table 19B, specifications and variable surface intervals are shown in Table 20, aspherical coefficients are shown in Table 21, and each aberration diagram is illustrated in FIG. 15.

TABLE 19A

| | Example 7 | | | | | |
|---|---|---|---|---|---|---|
| Sn | R | D | Nd | νd | θgF | Material |
| *1 | 183.6300 | 1.9900 | 1.72916 | 54.68 | 0.54451 | S-LAL18.OHARA |
| 2 | 36.3726 | 19.6300 | | | | |
| *3 | 588.2514 | 1.9900 | 1.73800 | 32.33 | 0.59005 | S-NBH53V.OHARA |
| 4 | 95.8733 | 11.0000 | | | | |
| 5 | −95.9807 | 2.0100 | 1.69560 | 59.05 | 0.54348 | K-LAFK58.SUMITA |
| 6 | −312.7882 | 4.3500 | 1.80518 | 25.46 | 0.61572 | FD6O-W.HOYA |
| 7 | −99.2144 | 1.3300 | | | | |
| 8 | −84.9176 | 1.9900 | 1.48563 | 85.19 | 0.53858 | K-PFK85.SUMITA |
| 9 | 1848.0785 | 0.9800 | | | | |
| 10 | 363.4146 | 7.0600 | 1.61266 | 44.46 | 0.56403 | J-KZFH1.HIKARI |
| 11 | −98.3427 | 0.1200 | | | | |
| 12 | 129.0934 | 1.5000 | 1.84666 | 23.78 | 0.61923 | FDS90-SG.HOYA |
| 13 | 88.1669 | 6.6400 | | | | |
| 14 | 92.8472 | 1.4900 | 1.72825 | 28.46 | 0.60772 | S-TIH10.OHARA |
| 15 | 59.4033 | DD[15] | | | | |
| *16 | 153.1363 | 3.5300 | 1.88300 | 40.76 | 0.56679 | S-LAH58.OHARA |
| 17 | 10434.0066 | DD[17] | | | | |
| 18 | 364.1030 | 4.2100 | 1.55232 | 63.46 | 0.53656 | N-PSK3.SCHOTT |
| 19 | −99.6518 | 1.2900 | 1.85000 | 27.03 | 0.60935 | J-LASFH23.HIKARI |
| 20 | −287.9146 | 0.1100 | | | | |
| 21 | 84.2404 | 3.9600 | 1.49700 | 81.61 | 0.53887 | FCD1.HOYA |
| 22 | 1039.9520 | 11.8400 | | | | |
| 23 | 88.0212 | 5.7500 | 1.49700 | 81.61 | 0.53887 | FCD1.HOYA |
| 24 | −191.1331 | DD[24] | | | | |

TABLE 19B

| | Example 7 | | | | | |
|---|---|---|---|---|---|---|
| Sn | R | D | Nd | νd | θgF | Material |
| 25 (St) | ∞ | 1.8800 | | | | |
| 26 | 74.1354 | 4.7500 | 1.84666 | 23.78 | 0.61923 | FDS90-SG.HOYA |
| 27 | −52.1546 | 1.0000 | 1.84850 | 43.79 | 0.56197 | J-LASFH22.HIKARI |
| 28 | 67.7183 | 5.1500 | | | | |
| 29 | −37.3171 | 1.0600 | 1.90043 | 37.37 | 0.57720 | TAFD37.HOYA |
| 30 | −410.6976 | DD[30] | | | | |
| 31 | 204.4578 | 1.0600 | 1.84850 | 43.79 | 0.56197 | J-LASFH22.HIKARI |
| 32 | 42.9129 | 9.4800 | 1.59282 | 68.62 | 0.54414 | FCD515.HOYA |
| 33 | −47.0053 | 0.5300 | | | | |
| 34 | 56.7400 | 9.8100 | 1.49700 | 81.61 | 0.53887 | FCD1.HOYA |
| 35 | −54.1931 | 0.5700 | | | | |
| 36 | 51.6339 | 3.5200 | 1.55298 | 55.07 | 0.54469 | J-KZFH4.HIKARI |
| 37 | 124.8200 | 3.8300 | | | | |
| 38 | −110.4462 | 1.5700 | 1.80000 | 29.84 | 0.60178 | S-NBH55.OHARA |
| 39 | 42.3955 | 5.8900 | 1.43700 | 95.10 | 0.53364 | FCD100.HOYA |
| *40 | −617.5886 | 46.1200 | | | | |

TABLE 20

Example 7

| | WIDE | MIDDLE1 | MIDDLE2 | TELE |
|---|---|---|---|---|
| Zr | 1.0 | 1.2 | 1.4 | 2.4 |
| f | 20.64 | 24.61 | 29.34 | 49.74 |
| Bf | 46.12 | 46.12 | 46.12 | 46.12 |
| FNo. | 2.76 | 2.76 | 2.76 | 2.75 |
| 2ω (°) | 99.8 | 87.0 | 75.8 | 48.6 |
| Y | 23.15 | 23.15 | 23.15 | 23.15 |
| DD[15] | 18.03 | 11.30 | 7.26 | 4.94 |
| DD[17] | 29.31 | 27.27 | 22.99 | 0.92 |
| DD[24] | 1.79 | 12.38 | 23.12 | 56.64 |
| DD[30] | 14.61 | 12.79 | 10.37 | 1.24 |

TABLE 21

Example 7

| Sn | 1 | 3 | 16 | 40 |
|---|---|---|---|---|
| KA | 1.0000000E+00 | 1.0000000E+00 | 1.0000000E+00 | 1.0000000E+00 |
| A4 | 2.0367673E−06 | −9.3859803E−07 | 4.5602447E−07 | 3.7333972E−06 |
| A6 | −5.7221931E−10 | 2.0456050E−11 | 9.6586566E−11 | 2.4280142E−10 |
| A8 | 1.4059939E−13 | 5.5100851E−13 | 8.0367276E−14 | 1.3615435E−12 |
| A10 | −2.8220983E−18 | −3.3705231E−16 | 1.8960652E−17 | −1.5456240E−15 |

Table 22 shows the corresponding values of Conditional Expressions (1) to (9) of the zoom lenses of Examples 1 to 7.

TABLE 22

| Expression Number | | Example 1 | Example 2 | Example 3 | Example 4 |
|---|---|---|---|---|---|
| (1) | z2t/f2 | 0.07 | 0.07 | 0.08 | 0.08 |
| (2) | z2t/z3t | 0.38 | 0.39 | 0.36 | 0.37 |
| (3) | (d12t+d23t)/(d12w+d23w) | 0.14 | 0.14 | 0.13 | 0.12 |
| (4) | z2a/z2t | 0.51 | 0.50 | 0.49 | 0.49 |
| (5) | z2b/z2t | 0.83 | 0.81 | 0.79 | 0.79 |
| (6) | TL/Y | 11.24 | 11.33 | 10.92 | 10.93 |
| (7) | th2/f2 | 0.01 | 0.01 | 0.02 | 0.02 |
| (8) | νp−νn | 68.07 | 68.07 | 65.26 | 65.26 |
| (9) | (θp−θn) + 0.001623 × (νp−νn) | 0.0348 | 0.0348 | 0.0378 | 0.0378 |

| Expression Number | | Example 5 | Example 6 | Example 7 |
|---|---|---|---|---|
| (1) | z2t/f2 | 0.08 | 0.08 | 0.07 |
| (2) | z2t/z3t | 0.32 | 0.35 | 0.32 |
| (3) | (d12t+d23t)/(d12w+d23w) | 0.12 | 0.12 | 0.12 |
| (4) | z2a/z2t | 0.50 | 0.48 | 0.51 |
| (5) | z2b/z2t | 0.81 | 0.78 | 0.82 |
| (6) | TL/Y | 10.94 | 10.83 | 10.92 |
| (7) | th2/f2 | 0.02 | 0.02 | 0.02 |
| (8) | νp−νn | 65.26 | 65.01 | 65.26 |
| (9) | (θp−θn) + 0.001623 × (νp−νn) | 0.0378 | 0.0377 | 0.0378 |

As is perceived from the data described above, even in a case where the zoom lenses of Examples 1 to 7 are configured to have a small size, high optical characteristics are implemented by favorably correcting various types of aberration.

Figure 16:
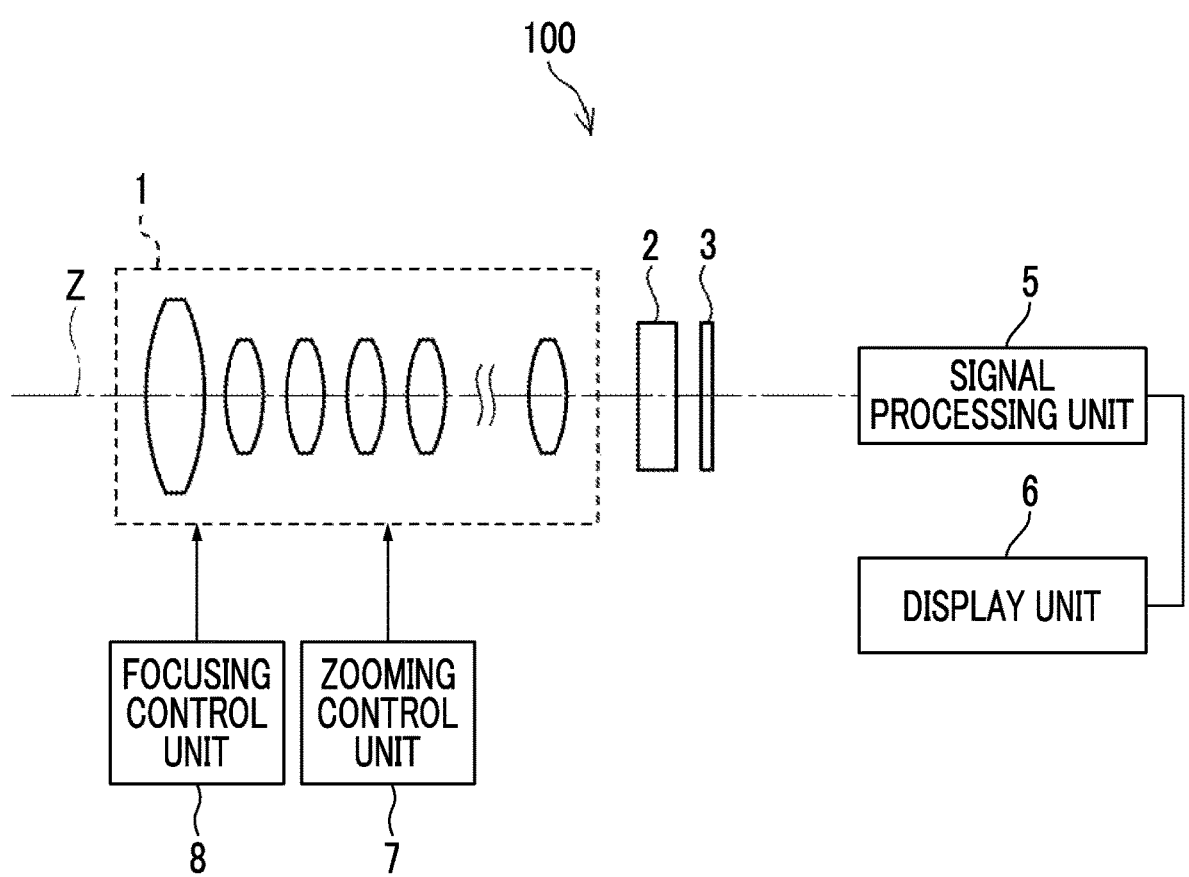
FIG. 16 is a diagram illustrating a schematic configuration of an imaging apparatus according to one embodiment.

Next, an imaging apparatus according to the embodiment of the present disclosure will be described. FIG. 16 illustrates a schematic configuration diagram of an imaging apparatus 100 using a zoom lens 1 according to the embodiment of the present disclosure as an example of the imaging apparatus according to the embodiment of the present disclosure. For example, a movie imaging camera, a broadcasting camera, a video camera, and a monitoring camera can be exemplified as the imaging apparatus 100.

The imaging apparatus 100 comprises the zoom lens 1, a filter 2 arranged on the image side of the zoom lens 1, and an imaging element 3 arranged on the image side of the filter 2. In FIG. 16, a plurality of lenses comprised in the zoom lens 1 are schematically illustrated.

The imaging element 3 converts an optical image formed by the zoom lens 1 into an electric signal. For example, a charge coupled device (CCD) or a complementary metal oxide semiconductor (CMOS) can be used as the imaging element 3. The imaging element 3 is arranged such that an imaging surface thereof matches an image surface of the zoom lens 1.

The imaging apparatus 100 also comprises a signal processing unit 5 performing calculation processing on an output signal from the imaging element 3, a display unit 6 displaying an image formed by the signal processing unit 5, a zooming control unit 7 controlling zooming of the zoom lens 1, and a focusing control unit 8 controlling focusing of the zoom lens 1. While only one imaging element 3 is illustrated in FIG. 16, a so-called three-plate type imaging apparatus including three imaging elements may also be used.

While the technology of the present disclosure is described above using the embodiment and the examples, the technology of the present disclosure is not limited to the embodiment and the examples and can be subjected to various modifications. For example, the radius of curvature, the surface interval, the refractive index, the Abbe number, the aspherical coefficient, and the like of each lens are not limited to the values illustrated in each numerical value example and may have other values.

What is claimed is:

1. A zoom lens consisting of, in order from an object side to an image side, a first lens group having a negative refractive power; a second lens group having a positive refractive power; a third lens group having a positive refractive power; a fourth lens group having a negative refractive power; and a fifth lens group having a positive refractive power,
   wherein the first lens group consists of, in order from the object side to the image side, a first A lens group that remains stationary with respect to an image surface during focusing, a first B lens group that moves during focusing, and a first C lens group that remains stationary with respect to the image surface during focusing,
   during zooming from a wide angle end to a telephoto end, the first lens group and the fifth lens group remain stationary with respect to the image surface, and the second lens group, the third lens group, and the fourth lens group move along an optical axis by changing a mutual interval,
   the second lens group at the telephoto end is positioned closer to the object side than the second lens group at the wide angle end,
   the third lens group at the telephoto end is positioned closer to the object side than the third lens group at the wide angle end,
   the fourth lens group at the telephoto end is positioned closer to the image side than the fourth lens group at the wide angle end,
   the fourth lens group includes a stop,
   in a case where a difference in optical axis direction between a position of the second lens group at the telephoto end and a position of the second lens group at the wide angle end is denoted by z2t, and a focal length of the second lens group is denoted by f2, Conditional Expression (1) is satisfied, which is represented by $$0.05 < z2t/f2 < 0.1 \quad (1),\text{and}$$

in a case where a difference in optical axis direction between a position of the third lens group at the telephoto end and a position of the third lens group at the wide angle end is denoted by z3t, Conditional Expression (2) is satisfied, which is represented by $$0.25 < z2t/z3t < 0.45 \quad (2).$$

2. The zoom lens according to claim 1,
   wherein in a case where an interval on the optical axis between the first lens group at the wide angle end and the second lens group at the wide angle end is denoted by d12w, an interval on the optical axis between the second lens group at the wide angle end and the third lens group at the wide angle end is denoted by d23w, an interval on the optical axis between the first lens group at the telephoto end and the second lens group at the telephoto end is denoted by d12t, and an interval on the optical axis between the second lens group at the telephoto end and the third lens group at the telephoto end is denoted by d23t, Conditional Expression (3) is satisfied, which is represented by $$0.01 < (d12t+d23t)/(d12w+d23w) < 0.2 \quad (3).$$

3. The zoom lens according to claim 2,
   wherein Conditional Expression (3-1) is satisfied, which is represented by $$0.05 < (d12t+d23t)/(d12w+d23w) < 0.16 \quad (3\text{-}1).$$

4. The zoom lens according to claim 1,
   wherein in a state where an object at infinity is focused, in a case where a focal length of the zoom lens at the wide angle end is denoted by fw, a focal length of the zoom lens at the telephoto end is denoted by ft, and a difference in optical axis direction between a position of the second lens group in a zooming state where the focal length of the zoom lens is $fw \times (ft/fw)^{0.2}$ and the position of the second lens group at the wide angle end is denoted by z2a, Conditional Expression (4) is satisfied, which is represented by $$0.45 < z2a/z2t < 0.55 \quad (4).$$

5. The zoom lens according to claim 4,
   wherein Conditional Expression (4-1) is satisfied, which is represented by $$0.47 < z2a/z2t < 0.53 \quad (4\text{-}1).$$

6. The zoom lens according to claim 1,
   wherein in a state where an object at infinity is focused, in a case where a focal length of the zoom lens at the wide angle end is denoted by fw, a focal length of the zoom lens at the telephoto end is denoted by ft, and a difference in optical axis direction between a position of the second lens group in a zooming state where the focal length of the zoom lens is $fw \times (ft/fw)^{0.4}$ and the position of the second lens group at the wide angle end is denoted by z2b, Conditional Expression (5) is satisfied, which is represented by $$0.75 < z2b/z2t < 0.85 \quad (5).$$

7. The zoom lens according to claim 6,
   wherein Conditional Expression (5-1) is satisfied, which is represented by $$0.76 < z2b/z2t < 0.84 \quad (5\text{-}1).$$

8. The zoom lens according to claim 1,
   wherein in a case where a distance on the optical axis from a lens surface of the second lens group closest to the object side to a lens surface of the second lens group closest to the image side is denoted by th2, and a focal length of the second lens group is denoted by f2, Conditional Expression (7) is satisfied, which is represented by $$0 < th2/f2 < 0.05 \tag{7}$$

9. The zoom lens according to claim 8,
wherein the second lens group consists of one positive lens.

10. The zoom lens according to claim 8,
wherein Conditional Expression (7-1) is satisfied, which is represented by $$0 < th2/f2 < 0.03 \tag{7-1}$$

11. The zoom lens according to claim 1,
wherein the fifth lens group includes at least one cemented lens consisting of one positive lens and one negative lens, and
in a case where a d line-based Abbe number and a partial dispersion ratio between a g line and an F line for the positive lens composing the cemented lens closest to the image side among the cemented lenses included in the fifth lens group are denoted by vp and θp, respectively, and a d line-based Abbe number and a partial dispersion ratio between a g line and an F line for the negative lens composing the cemented lens closest to the image side among the cemented lenses included in the fifth lens group are denoted by vn and θn, respectively, Conditional Expressions (8) and (9) are satisfied, which are represented by $$40 < vp - vn < 82 \tag{8}$$

$$0.03 < (\theta p - \theta n) + 0.001623 \times (vp - vn) < 0.042 \tag{9}$$

12. The zoom lens according to claim 11,
wherein Conditional Expression (8-1) is satisfied, which is represented by $$45 < vp - vn < 82 \tag{8-1}$$

13. The zoom lens according to claim 11,
wherein Conditional Expression (9-1) is satisfied, which is represented by $$0.032 < (\theta p - \theta n) + 0.001623 \times (vp - vn) < 0.04 \tag{9-1}$$

14. The zoom lens according to claim 1,
wherein the third lens group consists of four lenses.

15. The zoom lens according to claim 1,
wherein Conditional Expression (1-1) is satisfied, which is represented by $$0.06 < z2t/f2 < 0.09 \tag{1-1}$$

16. The zoom lens according to claim 1,
wherein Conditional Expression (2-1) is satisfied, which is represented by $$0.3 < z2t/z3t < 0.4 \tag{2-1}$$

17. An imaging apparatus comprising:
the zoom lens according to claim 1.

18. The zoom lens according to claim 1, wherein each difference in optical axis direction is measured relative to the first A lens group.

\* \* \* \* \*